United States Patent [19]
Lahti et al.

[11] Patent Number: 4,791,560
[45] Date of Patent: Dec. 13, 1988

[54] MACRO LEVEL CONTROL OF AN ACTIVITY SWITCH IN A SCIENTIFIC VECTOR PROCESSOR WHICH PROCESSOR REQUIRES AN EXTERNAL EXECUTIVE CONTROL PROGRAM

[75] Inventors: Archie E. Lahti, Fridley; Ralph L. James, Andovor; Larry L. Byers, Apple Valley, all of Minn.

[73] Assignee: Unisys Corporation, Blue Bell, Pa.

[21] Appl. No.: 761,138

[22] Filed: Jul. 31, 1985

[51] Int. Cl.⁴ ............................................. G06F 9/00
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 4,189,771 | 2/1980 | Roever | 364/300 |
| 4,291,388 | 9/1981 | Ecker, Jr. et al. | 364/900 |
| 4,317,170 | 2/1982 | Wada et al. | 364/200 |
| 4,325,121 | 4/1982 | Gunter et al. | 364/200 |
| 4,376,976 | 3/1983 | Lahti et al. | 364/200 |
| 4,425,616 | 1/1984 | Woodell | 364/200 |
| 4,428,043 | 1/1984 | Catiller et al. | 364/200 |
| 4,447,871 | 5/1984 | Terada et al. | 364/200 |
| 4,482,962 | 11/1984 | Amano et al. | 364/431.11 |
| 4,488,224 | 12/1984 | Ippolito et al. | 364/200 |
| 4,509,851 | 4/1985 | Ippolito et al. | 355/14 C |
| 4,580,216 | 4/1986 | Bellay et al. | 364/200 |
| 4,589,093 | 5/1986 | Ippolito et al. | 364/900 |
| 4,631,663 | 12/1986 | Chilinski et al. | 364/200 |
| 4,636,948 | 1/1987 | Gdaniec et al. | 364/300 |

Primary Examiner—Gary V. Harkcom
Assistant Examiner—Randy W. Lacasse
Attorney, Agent, or Firm—Charles A. Johnson; Laurence J. Marhoefer

[57] ABSTRACT

A system for controlling an activity (program) switch on a scientific processor having an external executive control program. It includes the sequencing of the hardware at a macro level rather than at the more detailed lower levels previously used. This sequencing and control is accomplished by providing a macro code control, a macro code store and an instruction buffer write data selector interconnected with the existing macro logic and the main storage of the scientific processor to provide a system for starting, running and stopping the scientific processor by an activity switch which responds to interrupt signals to selectively shift from the receipt of data from the main storage to the receipt of data from the macro code store.

7 Claims, 23 Drawing Sheets

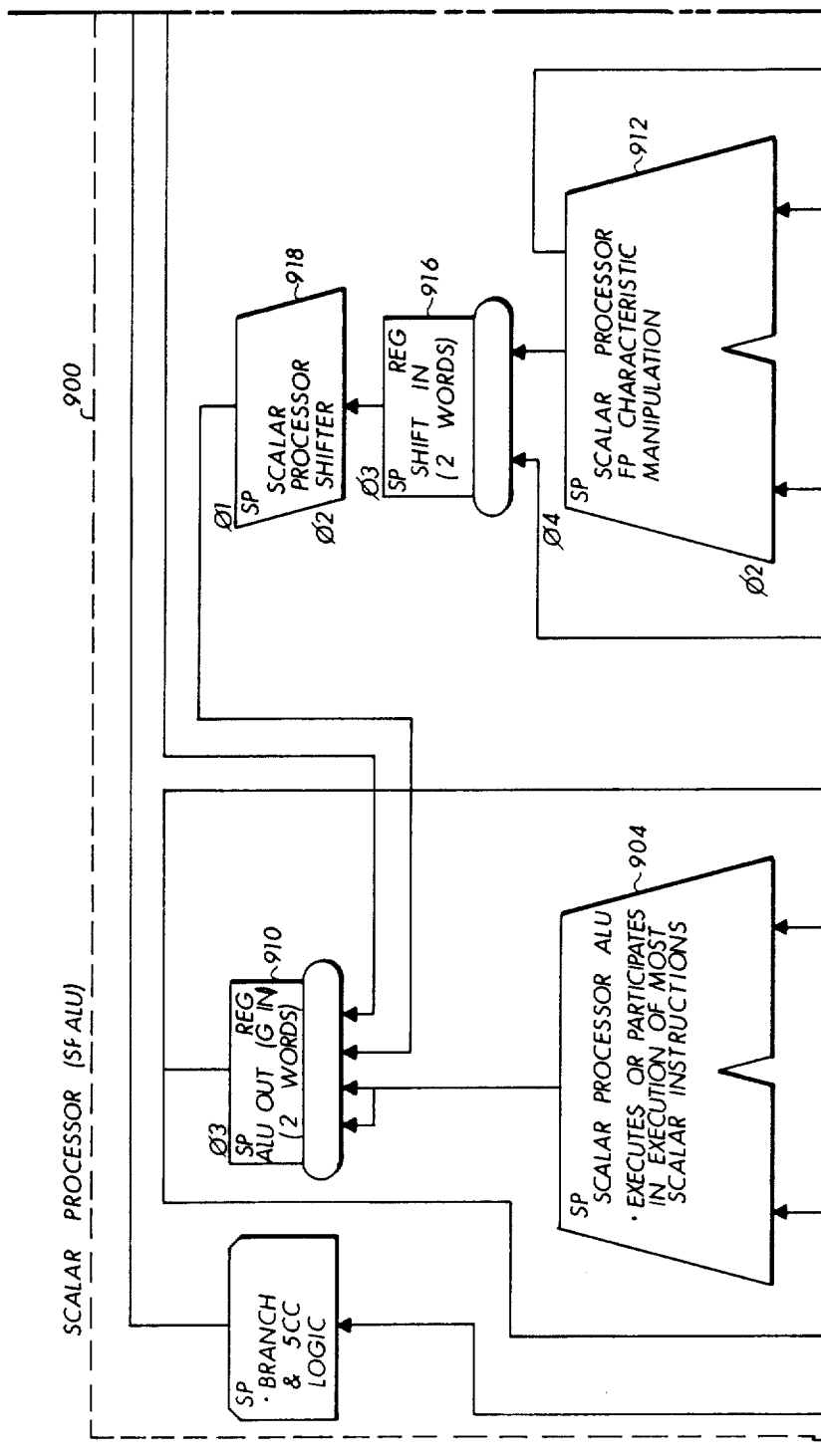

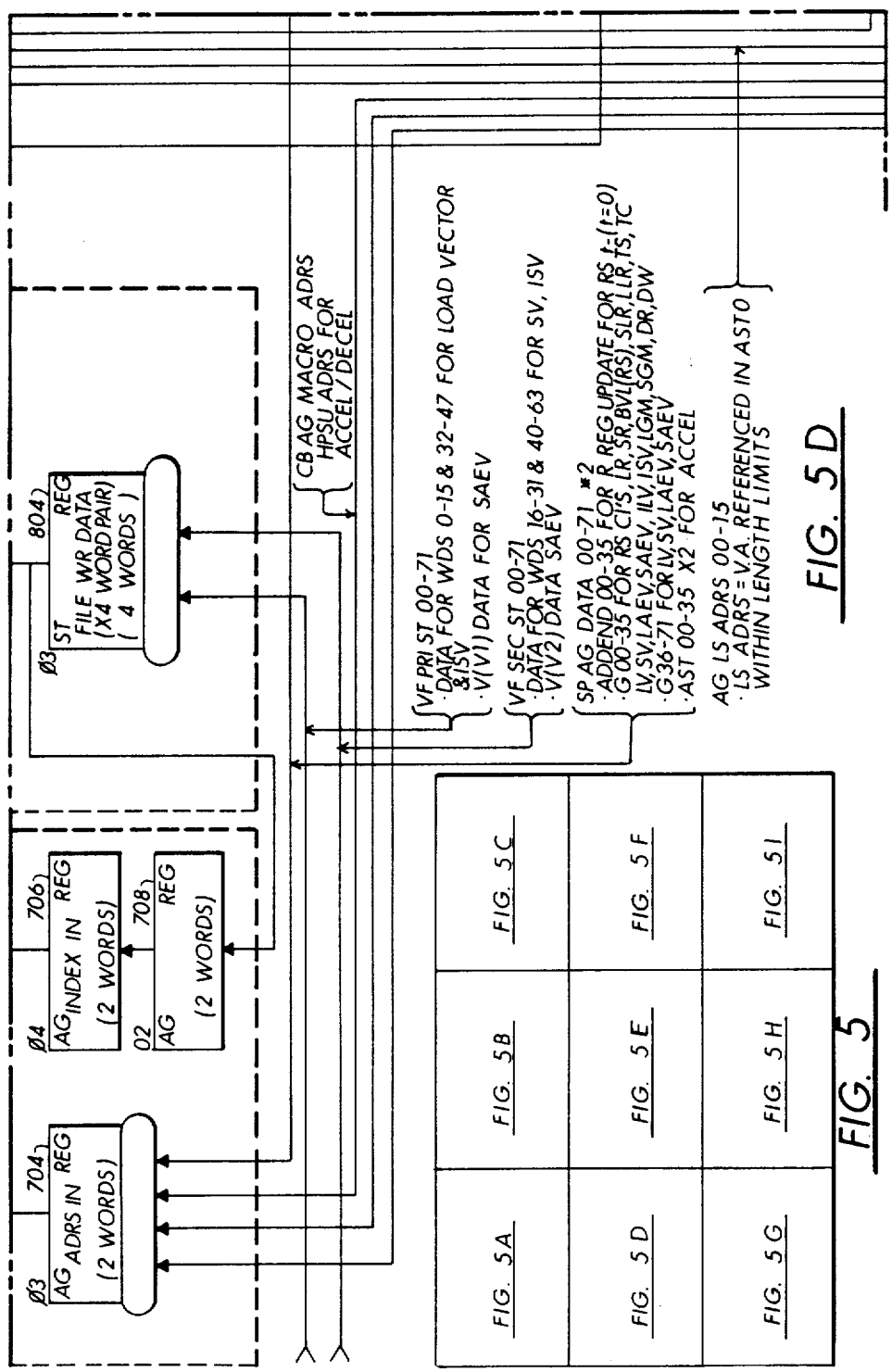

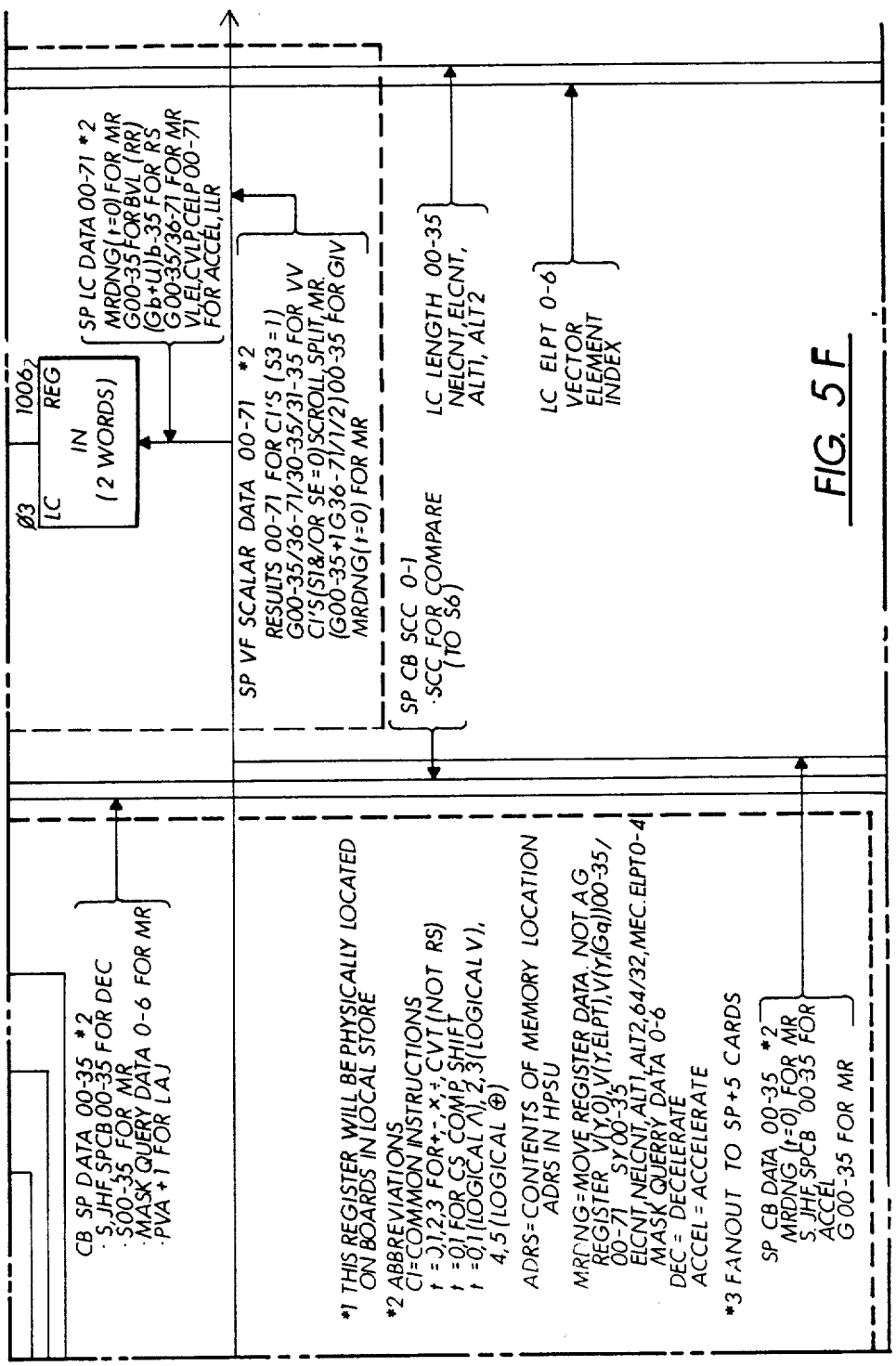

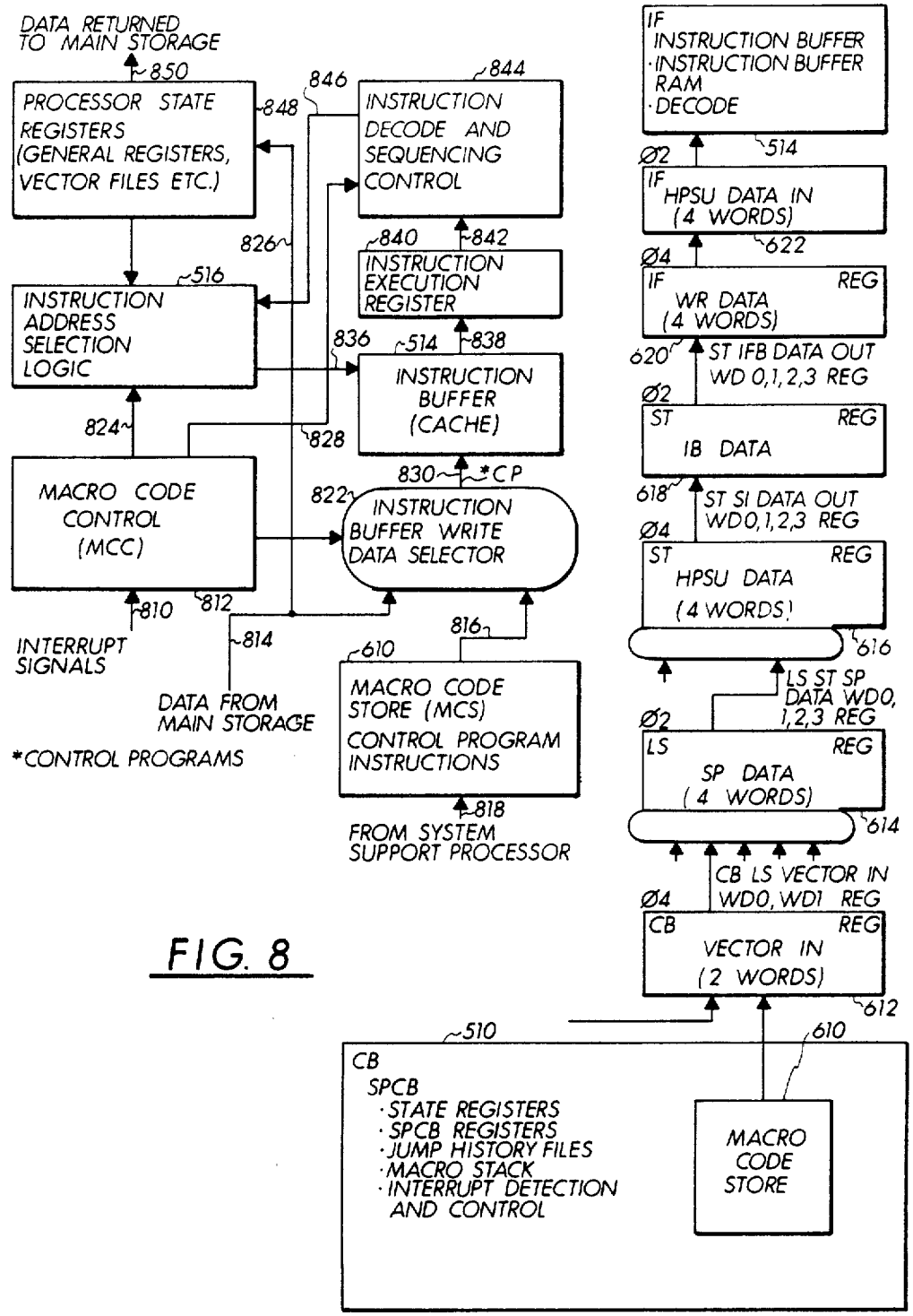

| Address | Contents |
|---|---|
| | — HIGH PERFORMANCE STORAGE UNIT — ~16<br>(HPSU) |
| HARDWARE REGISTER IN (SVP) | ~710<br>— MAILBOX —<br>WORD 0-1<br>WORD 2 CONTROL CODE; REAL ADDRESS OF AN SPCB<br>WORD 3-7 |
| MAILBOX WORD 2 | ~712<br>— SCIENTIFIC PROCESSOR CONTROL BLOCK — (SPCB)<br>WORD 0-4<br>WORD 5 REAL ADDRESS OF REGISTER SAVE AREA<br>WORD 6 NUMBER OF ACTIVITY SEGMENT TABLE (AST) ENTRIES<br>WORD 7-11<br>WORD 12 PROGRAM ADDRESS OF USER PROGRAM<br>WORD 13-15<br>WORD 16 AST ENTRY NUMBER ONE (WORD 0)<br>WORD 17 AST ENTRY NUMBER ONE (WORD 1) REAL ADDRESS OF LOCAL STORE SEG.<br>WORD 18 AST ENTRY NUMBER ONE (WORD 2) LENGTH OF LOCAL STORE SEGMENT<br>WORD 19 AST ENTRY NUMBER ONE (WORD 3)<br>WORD 20-143 AST ENTRY NUMBER 2-32 |
| SPCB WORD 5 | ~714<br>— REGISTER SAVE AREA — (RSA)<br>WORD 0-1023 VECTOR FILES 0-15<br>WORD 1024-1055 GENERAL REGISTERS 0-15<br>WORD 1056-1071 VECTOR LOOP AND ELEMENT LOOP REGISTERS 0-7<br>WORD 1072-1087 STATE REGISTERS 0-7<br>WORD 1088-1119 JUMP HISTORY FILE 0-31 |
| AST ENTRY 1 (WORD 1)<br>AST ENTRY 1 (WORD 1 + WORD 2) | ~716<br>— LOCAL STORE SEGMENT — (LSS)<br>WORD 0<br>— WORD 0 + X — |
| SPCB WORD 12 | ~718<br>— USER ACTIVITY — |

*FIG. 7A*

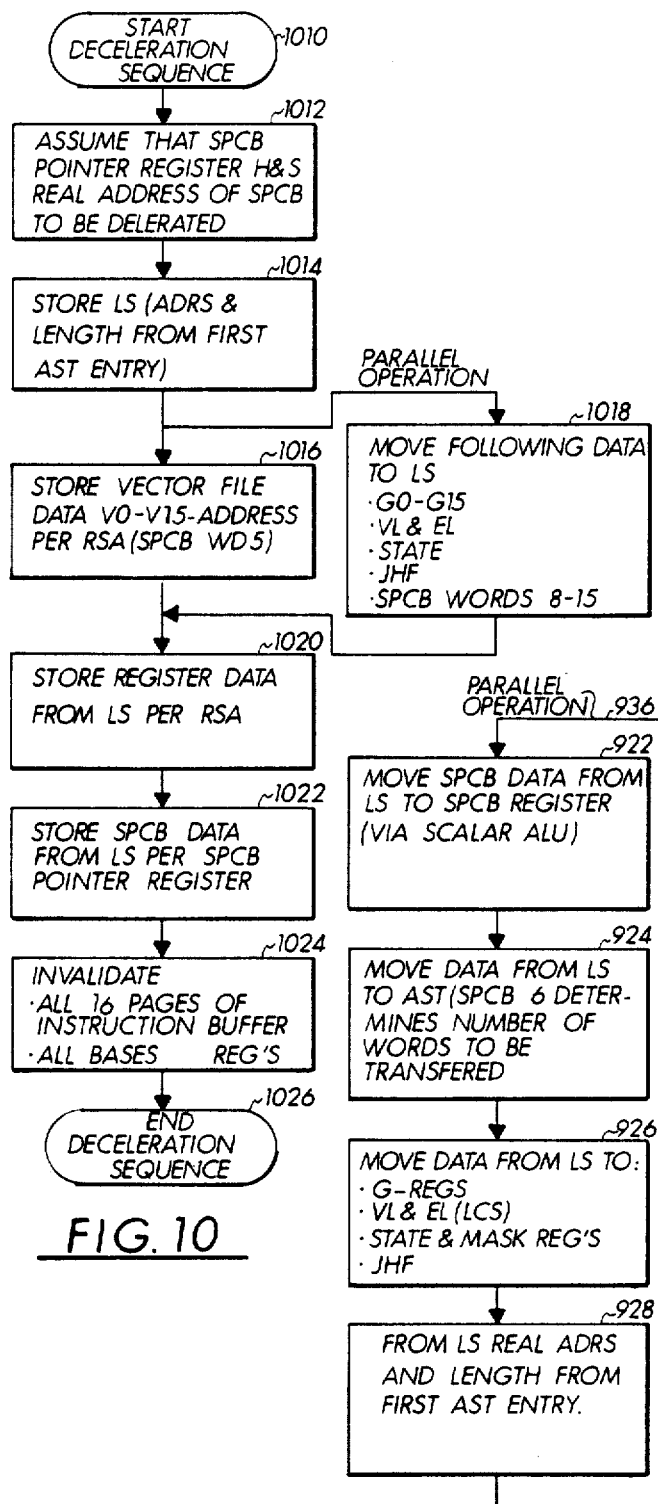
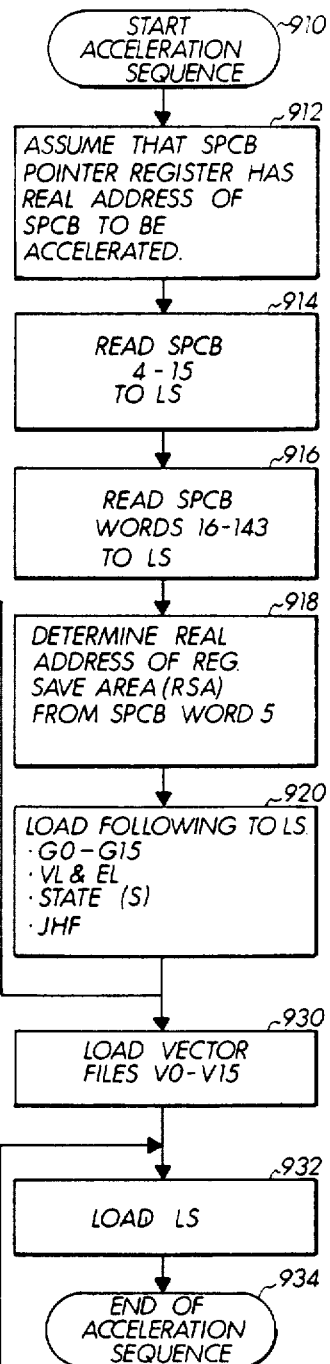
FIG. 9
FIG. 10

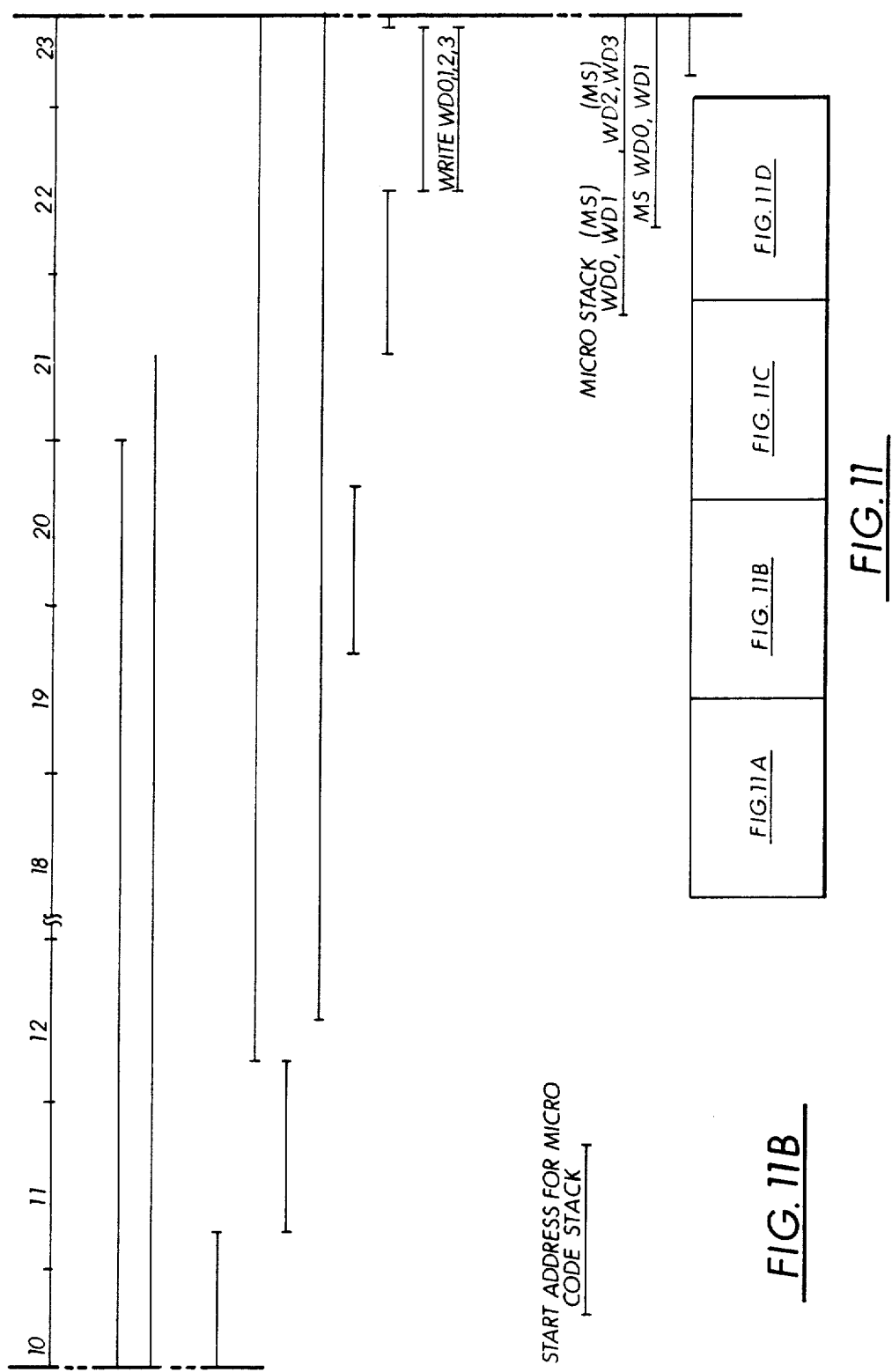

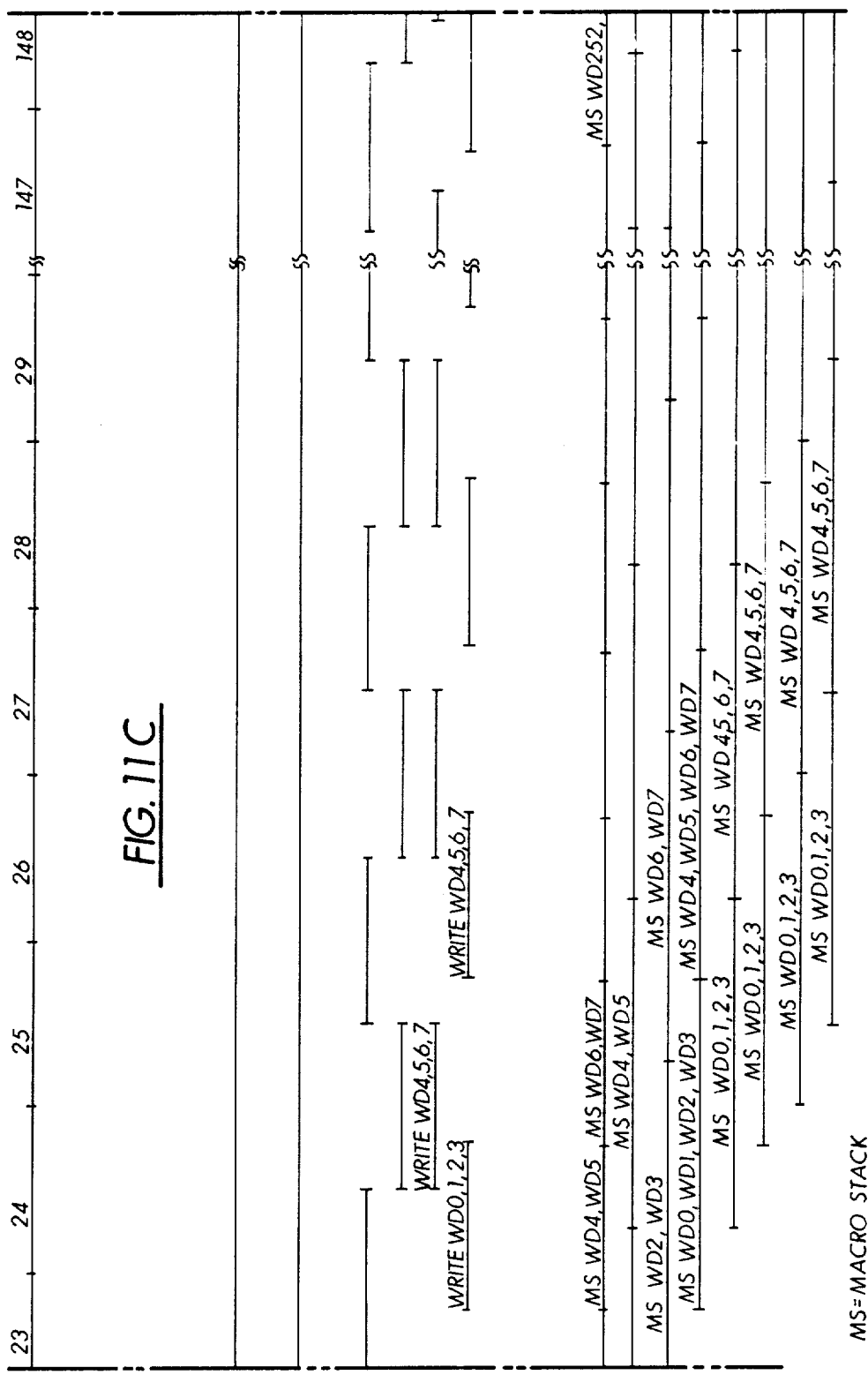

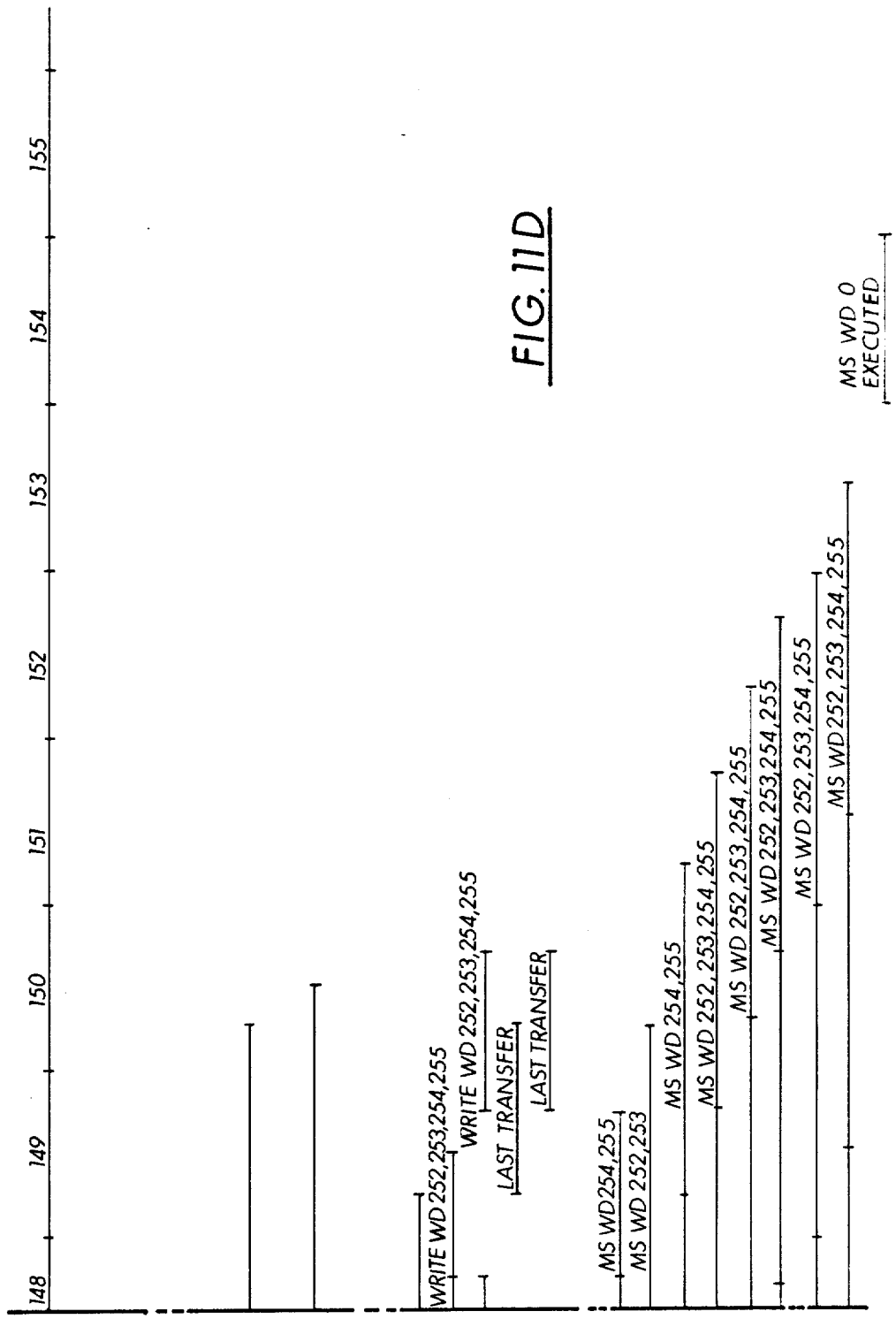

MACRO LEVEL CONTROL OF AN ACTIVITY SWITCH IN A SCIENTIFIC VECTOR PROCESSOR WHICH PROCESSOR REQUIRES AN EXTERNAL EXECUTIVE CONTROL PROGRAM

CONTENTS

Related Patent Applications
Contents
Background of the Invention
  A. Field of the Invention
  B. State of the Prior Art
Objects
Summary of the Invention
Brief Description of the Drawings
Description of the Preferred Embodiment
  A. Conventions
  B. The System
  C. High Performance Storage Unit
  D. Multiple Unit Adapter
  E. Scientific Processor
  F. Activity Control
  G. Local Storage
  H. Performance Accelerator Devices
  I. Interrupts
  J. Activity Switch
  K. Timing Diagram
Claims

RELATED PATENT APPLICATIONS

The following co-pending patent applications are assigned to the assignee of this invention, and their teachings are incorporated herein be reference:
Title: VECTOR/DATA LOGICAL USAGE CONFLICT DETECTION
  Inventor: Archie E. Lahti
  Ser. No.: 761,140
  Filed: July 31, 1985
Title: HIGH PERFORMANCE STORAGE UNIT
  Inventor: James H. Scheuneman
  U.S. Pat. No. 4,633,434
Title: MULTIPLE UNIT ADAPTER
  Inventor: James H. Scheuneman
  Ser. No.: 596,205
  Filed: Apr. 2, 1984, now abandoned 6/22/87.
Title: SCIENTIFIC VECTOR PROCESSOR
  Inventor: John T. Rusterholz
  Ser. No.: 761,201
  Filed: July 31, 1985

BACKGROUND OF THE INVENTION

A. Field of the Invention

This invention relates to the field of the digital data processing systems wherein one or more host data processors utilize one or more supporting scientific processors in conjunction with storage systems that are commonly accessible. More particularly it relates to an improved High Performance Storage Unit for use in such a digital data processing system. Still more particularly this invention relates to the macro level control of an activity switch in the supporting scientific vector processor. Even more specifically, the invention relates to a system for replacing the usual hardware controlled activity switch which has heretofore been implemented in microcode or some other primitive level of control with one that uses a macro instruction level of control.

B. State of the Prior Art

Digital data processing systems are known wherein one or more independently operable data processors function with one or more commonly accessible main storage systems. Systems are also known that utilize a support processor with its associated dedicated supporting, or secondary storage system. Such support processors are often configured to perform specialized scientific computations and are commonly under task assignment control of one of the independently operable data processors. The controlling data processor is commonly referred to as a "host processor". The host processor characteristically functions to cause a task to be assigned to the support processor; to cause required instructions and data to be transferred to the secondary storage system; to cause the task execution to be initiated; and to respond to signals indicating the task has been completed, so that results can be transferred to the selected main storage systems. It is also the duty of the host processor to recognize and accommodate conflicts in usage and timing that might be detected to exist. Commonly, the host processor is free to perform other data processing matters while the support processor is performing its assigned tasks. It is also common for the host processor to respond to intermediate needs of the support processor, such as providing additional data if required, responding to detected fault conditions and the like.

In the past, support scientific data processors have been associated with the host data processing systems. One such prior art scientific processor is disclosed in U.S. Pat. No. 4,101,960, entitled "Scientific Processor" and assigned to Burroughs Corporation, of Detroit, Mich. In that system, a single instruction multiple data processor, which is particularly suited for scientific applications, includes a high level language programmable front-end processor; a parallel task processor with an array memory; a large high speed secondary storage system having a multiplicity of high speed input/output channels commonly coupled to the front-end processor and to the array memory; and an over-all control unit. In operation of that system, an entire task is transferred from the front-end processor to the secondary storage system whereupon the task is thereafter executed on the parallel task processor under the supervision of the control unit, thereby freeing the front-end processor to perform general purpose input/output operations and other tasks. Upon parallel task completion, the complete results are transferred back to the front-end processor from the secondary storage system.

It is believed readily seen that the front-end processor used in this earlier system is a large general purpose data processing system which has its own primary storage system. It is from this primary storage system that the entire task is transferred to the secondary storage system. Further, it is believed to be apparent that an input/output path exists to and from the secondary storage system from this front-end processor. Since task transfers involve the use of the input/output path of the front-end processor, it is this input/output path and the transfer of data thereon between the primary and secondary storage systems which becomes the limiting link between the systems. Such a limitation is not unique to the Scientific Processor as disclosed in U.S. Pat. No. 4,101,960. Rather, this input/output path and the transfers of data are generally considered to be the bottleneck in many such earlier known systems.

The present scientific data processing system is considered to overcome the data transfer bottleneck by providing an unique system architecture using a high speed memory unit which is commonly accessible by the host processor and the scientific support processor. Further, when multiple high speed storage units are required, a multiple unit adapter is coupled between a plurality of high speed memory units and the scientific processor.

Data processing systems are becoming more and more complex. With the advent of integrated circuit fabrication technology, the cost per gate of logic elements is greatly reduced and the number of gates utilized is ever-increasing. A primary goal in architectural design is to improve the through-put of problem solutions. Such architectures often utilize a plurality of processing units in cooperation with one or more multiple port memory systems, whereby portions of the same problem solution may be parcelled out to different processors or different problems may be in the process of solution simultaneously.

The scientific processor discussed herein is intended for user code only. It does not run an executive operating system. Further, it does not require a control program nor does it have any privileged modes of operation. Such a scientific processor is usually intended for computation intensive processing. It is therefore assumed herein that most activities placed onto the scientific processor will execute for a long time relative to the typical time slice applied to instruction processors.

Since this scientific processor does not execute control program it is necessary to have some means of activity switching built into their architectures so that the activities required to be accomplished have some means of being initiated and terminated.

Almost invariably, earlier activity switches used in such scientific data processing systems have been hardware controlled. These switches were usually implemented either in microcode, or in some other primitive level of control. The very nature of these earlier systems required that such logical switching solutions be of a separate and detailed nature. That is, they could not, in any way utilize the existing logical networks because of their detailed and primitive control levels. These earlier control switches will be referred to herein as microcontrolled activity switches.

In a scientific processor, a unit of scheduled work is called an activity. In the proposed embodiment of the scientific data processing system, a scientific vector processor (SVP) is utilized in conjunction with a host system. As previously noted, the SVP has neither its own executive control program nor a privileged mode of execution. It is completely dependent upon the host system. All scheduling of its activities is done by the host system and each activity is explicitly dispatched to it. In all known former systems, these dispatched activities were implemented via separate microcontrolled activity switches with the consequent control occurring at the most primitivve microcode levels within the Scientific Vector Processor.

OBJECTS

It is a primary object of this invention to provide an improved digital data processing system wherein one or more host data processors utilize one or more supporting scientific processors in conjunction with storage systems that are commonly accessible.

Another primary object of the invention is to provide an improved Scientific Vector Processor (SVP) for use in a data processing system.

A further object of the present invention is to provide an improved activity control switch for such a scientific processor.

It is also an object of the present invention to provide an improved activity control switch for such a scientific processor which uses the basic inherent capabilities of the scientific processor.

It is another object of the present invention to implement a hardware controlled activity switch algorithm in a scientific support processor.

It is a still further object of the present invention to implement an activity control switch for a scientific processor via a macro instruction level of control rather than the usual implements in microcode or some other primitive level of control.

It is also an object of the present invention to provide a macro instruction level controlled activity switch for a scientific processor which utilizes existing and otherwise necessary capabilities of the scientific processor with minimum additional logical complexity and/or hardware for this purpose.

The foregoing objectives and other more detailed and specific objects will become apparent and be understood from the drawings and the description of the invention.

SUMMARY OF THE INVENTION

The digital data processing system includes one or more host processors each coupled to one or more high performance storage units. Host processors can be selected from units available commercially, where the 1100/90 System available from Sperry Corporation is found to be particularly advantageous.

The High Performance Storage Unit (HPSU) is unique, and is basically a memory unit capable of coupling to various pluralities of instruction processors, and input/output units as well as to a pair of Scientific Vector Processor (SVP). Since each HPSU is directly connected to the input/output units and the instruction processors of the host system, it is an inherent part of the host data processing system. On the other hand, since it is also directly connected to the Scientific Processor, it is also its main storage system. Because of its novel properties, it is able to interface both with the host system and the Scientific Processor without the resulting "bottleneck" of past scientific data processing systems.

When more than one HPSU is desired to provide additional storage capacity, a Multiple Unit Adapter (MUA) is utilized between each Scientific Processor (MUA) is utilized between each Scientific Processor and multiple High Performance Storage Units. Generally, the MUA is an interface unit which couples a single Scientific Vector Processor through the use of a single Scientific Vector Processor port to a plurality of up to four HPSUs via four HPSU ports. In this manner a Scientific Vector Processor may address, read and write any location in any of the HPSUs.

The MUA is used in a scientific data processing system to interface at least one Scientific Vector Processor to a plurality of High Performance Storage Units. The use of a separate MUA in such a data processing system enables the Scientific Vector Processor of such a system to have a single HPSU port to thereby reduce the cost of the Scientific Vector Processor when a single HPSU is desired to be used in the system. This MUA is required only when more than one HPSU is used in the scientific data processing system, thereby providing the additional memory interfaces needed for the Scientific Vector Processor.

The Scientific Vector Processor (SVP) used herein as a special purpose processor attached to the host system via the HPSU(s). It is optimized for high speed execution of floating-point vector arithmetic operations. The SVP provides increased performance for both integer and floating-point scalar operations that are embedded in the vectorized code to thereby provide overall increased performance for scientific vector FORTRAN programs.

The present invention provides a means and a method for implementing an activity (program) switch algorithm on such a scientific processor. It includes the controlling and sequencing of the hardware at a macro level rather than at the more detailed lower levels previously used. It accomplishes this by utilizing an implementation that uses less additional hardware than earlier systems, yet it performs at a similar rate. Specifically as shown in FIG. 8 it provides a macro code control means, a macro code store means and an instruction buffer write data selector interconnected with the existing macro logic of the processor to provide a system for starting and stopping an activity switch. In either case, the operation is initiated by the receipt of an interrupt signal. To illustrate the system operation, first assume that the scientific vector processor is dormant. To start the activity, the macro code control means (MCC 812) initially scans for interrupts 810. When one occurs, the MCC transfers the control program (CP) contained in the macro code store 610 (previously received from the system support processor) into the instruction cache buffer 514, which buffer already exists in the scientific vector processor. The MCC then initiates the execution of the CP.

Next, the control program transfers the activity state conditions housed in the main system storage into the various processor state registers 814. Finally, the control program initiates the new activity into execution. To stop the activity, the MCC means again scans for interrupts. When one occurs, it halts the execution of the present activity; transfers the control program from the macro control store (MCS) into the instruction cache buffer and initiates the further execution of the control program. Next, the control program transfers 850 the activity information from the various processor state registers back to the main system storage. Finally, the control program halts and the Scientific Vector Processor is returned to the dormant condition. The terms acceleration and deceleration will be used throughout this description. They correspond to the initiation and termination of a control program activity respectively.

BRIEF DESCRIPTION OF THE DRAWINGS

FIGS. 5 and 5A–5I in composite, represent detailed block diagram illustrating the inclusion of the proposed invention into the scalar portion of the scientific processor;

FIG. 6 is a simplified functional block diagram of the inventive system as used in the over-all data processing system;

FIGS. 7A and 7B represent a pictorial block diagram illustrating how an activity is set up in the HPSU for a Scientific Vector Processor;

FIG. 8 is a generalized block diagram of the proposed macro code control structure incorporated into the Scientific Vector Processor;

FIG. 9 is a flow diagram illustrating the data transfer sequence for the activity switch for an acceleration operation;

FIG. 10. is another flow diagram illustrating the data transfer sequence for the activity switch for a deceleration operation;

DETAILED DESCRIPTION OF THE PREFERRED EMBODIMENT

A. Conventions

Figure 1:
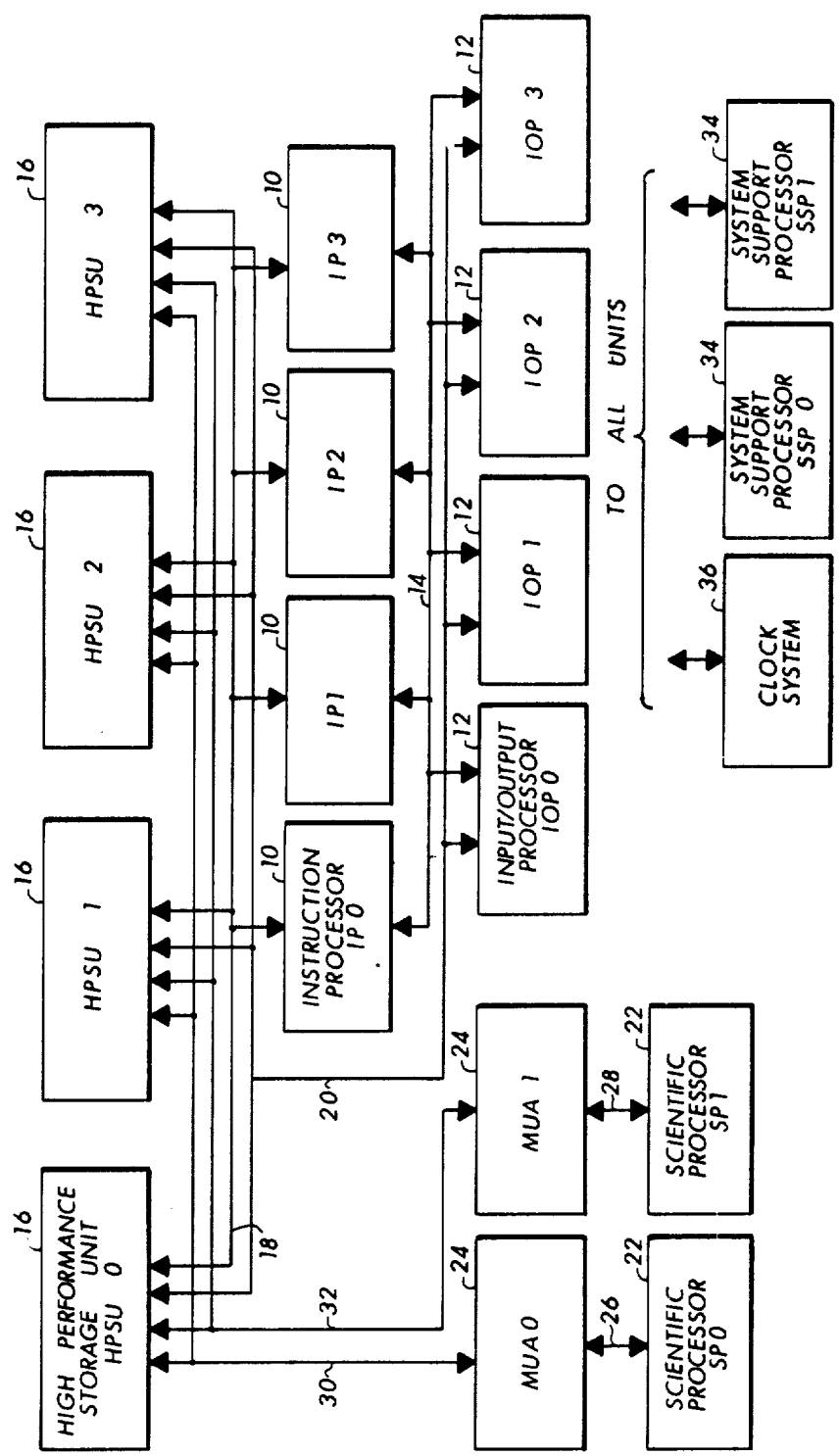
FIG. 1 is a system block diagram of the over-all digital data processing system in which the invention can be utilized.

Throughout the following description and in the accompanying drawings there are certain conventions employed which are familiar to those that are skilled in the art to which this invention pertains. Within the application, reference numerals will be affixed to elements and items discussed. To the extent possible, elements that are referenced in different figures within the application will bear the same reference numeral. It will be understood that elements may be described or mentioned in others of the identified co-pending applications, but will not necessarily bear the same numeral reference between applications.

The signal lines, control lines, and cables are accorded unique descriptive names which will remain invariant to the extent possible at all points of usage and reference within the application. Signal lines generally enter at the bottom of a Figure and exit at the top, resulting in a general flow from bottom to top. Signals and signal lines which enter or exit the logic circuit of a Figure all together from outside the circuit are accorded descriptive symbolism in order that they may be clearly recognized.

Block diagrams will be utilized to describe the interrelationship of identified functional units. Interconnecting lines between functional units can represent a single wire conductor, a group of parallel conductors, or a general path of data or control flow. In block diagrams the arrowhead will indicate the direction of signal flow for the particular data or control signals identified. Where appropriate, emphasis for particular lines may be added to indicate specific paths, for example through the use of heavy lines; through addition of numerals indicative of the number of conductors or parallel signal paths involved, or by indication of unique function. Within block diagrams specific logical symbols for well known components such as adders, selecters, registers, multiplexers, and the like may be utilized without further explanation of the specific elements, since such elements are so well known in the art that they require no additional explanation.

For purposes of discussion of specific logic block diagrams or functional logic circuits, it is convenient to have a reference of signal levels. For many it is desirable to relate logical "1" and logical "0" to signal levels. In general, a logical "1" will be the equivalent of a High signal, and a logical "0" will be the equivalent of a Low signal, but it should be clearly understood that as given input signals pass through networks of logic circuits that the relationship of logical "1" and logical "0" as they relate to numerical values will not directly relate. Accordingly, the clearest understanding of logic block diagrams and functional logic circuits will be most clearly understood from a consideration of the High and Low signal interrelationships. It is of course understood that these representations of signal levels are illustrative and relate to a rendition of the preferred embodiment, but that alternative signal level representations can be used without departing from the scope of the invention.

In more detailed logic block diagrams, block symbols will be utilized to represent various functions. For the lower order logical functions such as AND designated A; OR; Inversion designated I, and the like, the designations within the block symbols of the respective functions is readily understandable to those skilled in the art. More complex macro logical functions, for example multiple input Exclusive-OR designated XOR, may not be readily apparent from the block symbol, and in such cases the macro function will be further defined through functional logic diagrams or truth tables or a combination thereof.

As a further aid in understanding the logic block diagram representations, a system of arrowhead representation at the input and output of the block symbols will assist in defining the function of the associated logic element. In this regard, the combination of signals represented at the input of a logic element in combination with the designation of the logical function will define the signal level or levels at the output of the logic element. At the input, a closed half-arrowhead represents a response to a High signal and an open half-arrowhead indicates that the response is to a Low signal. Accordingly, if an AND circuit (A) is represented having two or more closed half-arrowheads at the input, it will indicate that the AND function is on High signals and will be satisfied only when all input lines receive High signals. In a similar manner, if an A symbol is illustrated having two or more open-arrowhead inputs, the function designated is that of Low AND, and will be satisfied only when all inputs are Low. It is apparent that this Low AND function is logically equivalent of an High OR function. In a similar fashion, the half-arrowhead convention is applied to define output relationships.

In physical construction of circuits to implement the designated logic functions, it is not uncommon to provide signal inversion in conjunction with the combinatorial logic function. In such cases, the fact of inversion will be designated by the state of the half-arrowhead on the output line or lines. In this way, it will be understood that a Low AND circuit having two or more open half-arrowhead inputs will provide a Low output signal at the open half-arrowhead output terminal only when all input signals are Low. If the Low AND circuit has a closed half-arrowhead at its output, it is understood that inversion takes place within the logic block element, and the High output signal will be derived only when all input signals are low. It is also common for circuits implemented through integration techniques to provide an output signal and the complement of the output signal on separate lines. This representation in the logic block diagram symbol will result in an open half-arrowhead and a closed half-arrowhead at the output of the block. Generally speaking the right-most half-arrowhead in the symbolic representation will be considered as the true output and will define the function of the element, and the left-most half-arrowhead will be considered as the complement thereof. For example, an A symbol having two or more closed half-arrowhead inputs and a right-most closed half-arrowhead would normally indicate an AND function of High signals resulting in a High output signal at the closed half-arrowhead only when all input signals are High. If this same symbol utilizes an open half-arrowhead at the left, a Low output signal will be derived at that point when all input signals are High. It is not deemed necessary to illustrate specific circuits to accomplish the basic logic functions since various types of electronic circuits can be utilized and are well known to those skilled in the art.

In the event detailed logical circuit diagrams of macro symbols are illustrated, the symbol having a straight bottom and rounded top, sometimes referred to as the "bullet" symbol, represents the logical AND function and the symbol having a curve at the input and the curve pointed output, often referred to as the "shield" symbol, represents circuits that perform the logical OR function. For the AND function the straight line input or the dot, represents a High AND, and results in a High output signal when all input signals are High. The open circles adjacent the input terminals indicate that the circuit responds to Low signals. The straight line output is equivalent to the closed half-arrowhead representation described above, and the circle output designation is equivalent to the open half-arrowhead representation. This type of symbol is well known in the art and need not be described further.

B. The System

FIG. 1 is a system block diagram of the over-all digital data processing system in which the invention can be utilized. The over-all system is essentially modular, and provides for parallel processing.

For the configuration illustrated, from one to four Instruction Processors IP0 through IP3, each labelled 10, can be utilized. Each IP can, for example, be a Type 3054-00 unit available from Sperry Corporation, or such other Instruction Processor available commercially as would be compatible. The IP provides basic mode and extended mode instruction execution, virtual machine capability, and contains two buffer memories (not shown), one an operand buffer, and the other an instruction buffer. Each IP is functional to call instructions from memory, execute the instructions, and, in general, does data manipulation. The IP also executes instructions to set up input and output data buffers and channel access control.

In conjunction with the IPs, from one to four Input/Output Processors IOP0 through IOP3, labelled 12, can be utilized. The interconnections between the IPs and the IOPs, collectively labelled 14, are, in fact, direct connections between each unit, and the interconnection is not bused. Each IOP can be a Type 3067-00 unit available from Sperry Corporation, or an equivalent type of processor. The IOPs handle all communications between the IPs, and the memory systems, and the peripheral subsystems (not shown). In this type of configuration, the IPs functions as the system Central Processing Units, and the IOPs act as CPUs to handle all of the communications. The IPs and IOPs are commonly referred to as the 1100/90 system.

From one to four High Performance Storage Units HPSU0 through HPSU3, each labelled 16, can be utilized in the system. Each HPSU is a free-standing unit with eight memory Banks, each Bank containing 524K words. Each HPSU provides four Instruction Processor (IP) ports for providing communication paths to the IPs, both for reading and writing, shown collectively as interconnection paths 18. Again it should be understood that interconnection between each HPSU and each IP is directly cabled, and is not bused. Each HPSU also includes four Input/Output Processor (IOP) ports for interconnection with the IOPs. These interconnections are shown collectively as interconnections 20 and are direct cables between each HPSU and each IOP. The IP and the IOP ports are each two-word read and write interfaces, where each word contains 36 data bits and four parity bits. Each HSPU also includes at least one Scientific Vector Processor (SVP) port, and in the embodiment shown has two such SVP ports. Each SVP port has a four-word data interface. The IOP and the IP interfaces operate on a 60 nanosecond clock cycle and the SVP interface operates on a 30 nonosecond clock cycle. The HPSU is a novel memory system and is described in one or more of the above identified copending incorporated patent applications.

In the embodiment illustrated one or two Scientific Vector Processors SP0 and SP1, labelled 22, can be utilized. If a single SVP is used with a single HPSU, it may be coupled directly to the SVP port of such HPSU. When two or more HPSUs are used with a SVP, it is necessary to provide a Multiple Unit Adapter (MUA) for each SVP. In this configuration MUA0 and MUA1, each labelled 24, are coupled to SP0 and SP1, respectively, across interface lines 26 and 28. MUA0 is coupled to each HPSU through interconnection paths 30, and MUA1 is coupled to each HPSU through interconnection path 32.

Each SVP functions under direction of one or more of the IPs to perform scientific type calculations in a support mode. In this regard, the IPs can be considered to be host processors and the SVP can be considered to be scientific processors, all operating through common storage.

The over-all system maintenance and supervision is accomplished through one or two System Support Processors SSP0 and SSP1, each labelled 34, which are connected to all units of the system. The SSP is available commercially and is utilized in the Sperry Corporation 1100/90 Systems. In general, it is understood that each SSP performs the function of a hardware maintenance panel for the system. The display and getting of information, the activation of most maintenance facilities, selecting modes of operation and the like, are all done at the control section of the SSP.

A Clock System 36 is utilized to maintain synchronous operation of the entire system. Clock and synchronizing signals are sent to each IP as will as each HPSU, each IOP, and each SVP. The clock interface includes signals and commands for the IP for controlling clock rates, clock mode, cycle count, and other capabilities of the clock. The clock system is novel, and is described in one of the above identified copending patent applications.

Intercommunication between units is essentially on a Request and Acknowledge basis, and the interfaces will be described in more detail as appropriate.

C. High Performance Storage Unit (HPSU)

Figure 2:
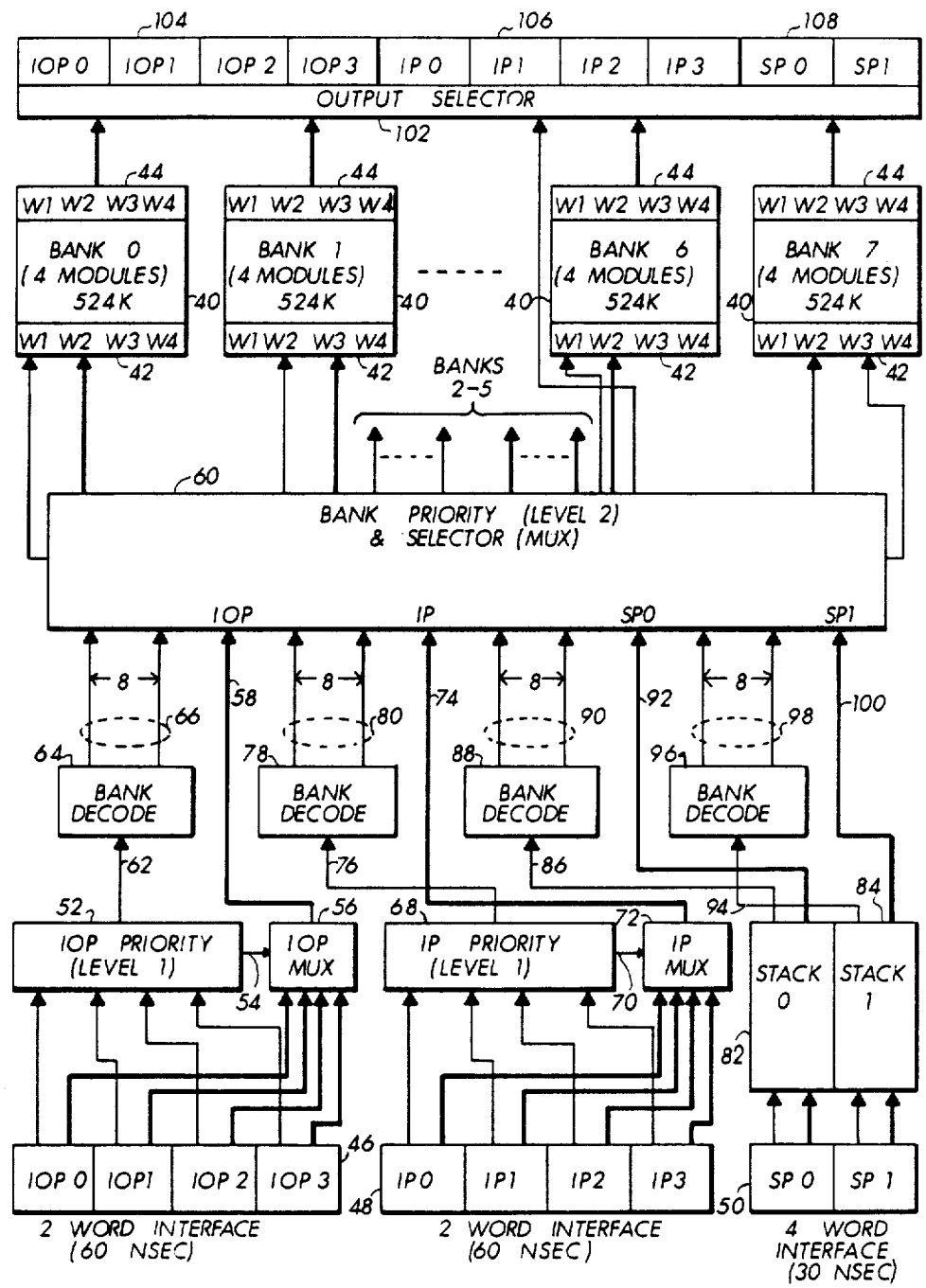
FIG. 2 is a simplified functional block diagram of the High Performance Storage Unit.

FIG. 2 is a simplified functional block diagram of the High Performance Storage Unit.

The HPSU is a storage device that is commonly accessable by the IPs, the IOPs, and the SPs via the MUAs. The various devices that can be coupled to the HPSU can have differing interface systems and operational rates.

In the preferred embodiment, the HPSU utilizes eight Banks of storage devices, generally identified as Bank 0 through Bank 7 of which Banks 0, 1, 6, and 7, are illustrated, and each labelled 40 since they are essentially similar. Though not specifically illustrated, each Bank is comprised of four Memory Modules and each Bank has a total capacity of 524K words. A word in memory is 44-bits, of which 36-bits are data bits and the remaining eight bits are utilized for Error Correction Code (ECC) check bits and parity bits. Each Bank 40 is arranged for receiving four words W1, W2, W3, and W4, labelled 42 for writing, and four such words labelled 44 when read out.

The memory Banks 40 include the addressing circuitry, the storage cells, the timing circuits, and the driver circuits, and can be constructed from commercially available components, it being understood that the accessing rate must accommodate the interface rates with the attached units.

The heavy lines indicate directions of data flow, and the single lines indicate control flow.

At the input, the HPSU has an IOP interface 46 which can accommodate up to four IOP units, at the four IOP ports labelled IOP0 through IOP3. It also has an IP interface 48 which can accommodate up to four IPs at the four IP ports designated IP0 through IP3. The IOP ports 46 and the IP ports 48 each operate on a two-word interface at a clock rate of 60 nanoseconds.

The HPSU alone has an input SP interface 50 which can accommodate two SPs at the two ports labelled SP0 and SP1. The SP ports each function with a four-word simultaneous interface and operate at a clock rate of 30 nanoseconds.

The request and control signals from the IOP ports 46 are passed to the IOP Priority 52, which functions to select the particular IOP to be given priority of access to the memory system. The selection is passed on line 54 to the IOP MUX 56 which functions to select the appropriate data and address information to pass on line 58 to the Bank Priority and Selector (MUX) 60. The control signals provided on control path 62 drive the Bank Decode 64 for selecting one-of-eight control lines 66 for providing control signals for making Bank selection.

In a similar manner, the IP ports 48 provide control signals to the IP Priority 68, which provides control signals on control line 70 to the IP MUX 72 for selecting the data and address signals that will be provided on path 74. Similarly, the control signals on line 76 to the Bank Decode 78 results in signals being provided to select one of eight lines 80 for controlling Bank selection.

The two SP ports 50 are each arranged to store requests in Stack 0 labelled 82, and in Stack 1 labelled 84. SVP requests and data are temporarily held in Stack 0 and Stack 1 awaiting availability of the memory system. In essence, Stack 0 and Stack 1 are each a first-in-first-out (FIFO) circulating buffer. The request information feeds out of Stack 0 on line 86 to the Bank Decode 88 which provides a one-of eight selection and data passes on line 92 to the Bank Priority Selector 60. Similarly, request information passes on line 94 to the Bank Decode 96 for making selections on lines 98, while the data passes on line 100.

The Bank Priority and Selector functions to select between the IOP, IP, and the two SVP requests presented to it for accessing memory. It also functions to control the Output Selector 102 when reading is to take place.

The HPSU has an IOP output 104 capable of handling four IOP ports IOP0 through IOP3. It also has an IP output 106 capable of handling four IP ports labelled IP0 through IP3. Finally, it has an SVP output 108 capable of handling two SP output ports labelled SP0 and SP1. Data rates and timing at the output ports 104, 106 and 108 are similar to those for the input ports previously described.

D. Multiple Unit Adapter (MUA)

Figure 3:
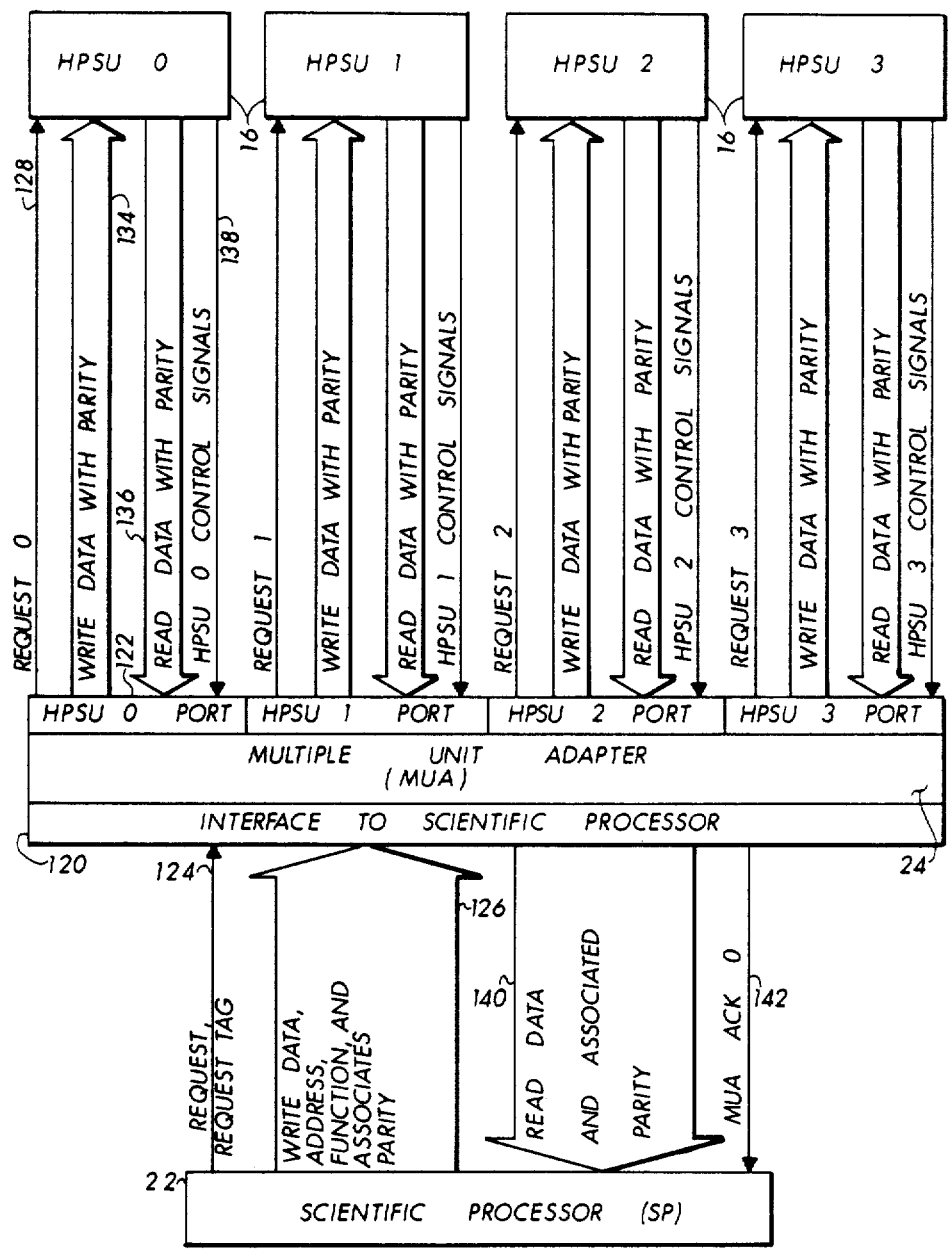
FIG. 3 is a simplified block diagram of the Multiple Unit Adapter (MUA) for providing selective interconnection of a Scientific Processor to one of up to four High Performance Storage Units.

FIG. 3 is a simplified block diagram of the Multiple Unit Adapter (MUA) for providing selective interconnection of a Scientific Processor to one of up to four High Performance Storage Units.

The MUA 24 has an Interface to Scientific Processor 120 and up to four HPSU ports 122, each adapted for interconnection to an associated HPSU 16.

A Scientific Vector Processor (SVP) issues Request signals on control path 124 to the MUA. For a write operation, the write data, address, function, and associated parity is provided via cable 126. The MUA can accumulate up to eight requests from the SP without acknowledgement, and the requests and the associated data are stored in a first-in-first-out (FIFO) stack (not shown).

For purposes of example, if it is assumed that the SVP has designated HPSU0, and the request is determined by the MUA to be the next request to be processed, a Request 0 will be provided on control path 128 to HPSU0. Recalling that this will be only one of several requests that can be provided to HPSU0, it will be honored when its priority is selected. If the function is write, the write data with parity will be provided on cable 134. If the function is to read, the read data with parity will be passed from HPSU0 on cable 136 to the MUA. Upon completion of the requested function, the HPSU0 control signals will pass via control path 138 to the MUA. When the MUA establishes that the current request is a read, the read data and associated parity will pass to cable 140 to the SVP. As each request is passed on to the selected HPSU, an MUA Acknowledge 0 (ACK 0) signal will be passed on control path 142 to the SVP thereby indicating that the stack has room for one more request.

When the MUA has passed eight requests to an HPSU without acknowledgement the MUA ceases requesting until an Acknowledge 1 (ACK 1) control signal is received in control cable 138.

The control and data path lines for HPSU1, HPSU2, and HPSU3, functions in a similar manner. When the SVP requests access to a different HPSU, all outstanding requests to the first HPSU must be serviced prior to the MUA processing requests to a different HPSU.

All data and control signals from the SVP are passed on to the HPSU, and all data and control signals from the HPSU are passed on to the SVP with the exception of a few special control signals. The SVP data word is four 36-bit words wide. Along with the data field, an address field of 22-bits and a function field of 6-bits are sent with the request. Odd parity is provided for every 9-bits of data, making the SVP data word transmission a total of 160-bits, the address field a total of 25-bits, and the function code field a total of 7-bits.

E. Scientific Vector Processor (SVP)

Figure 4:
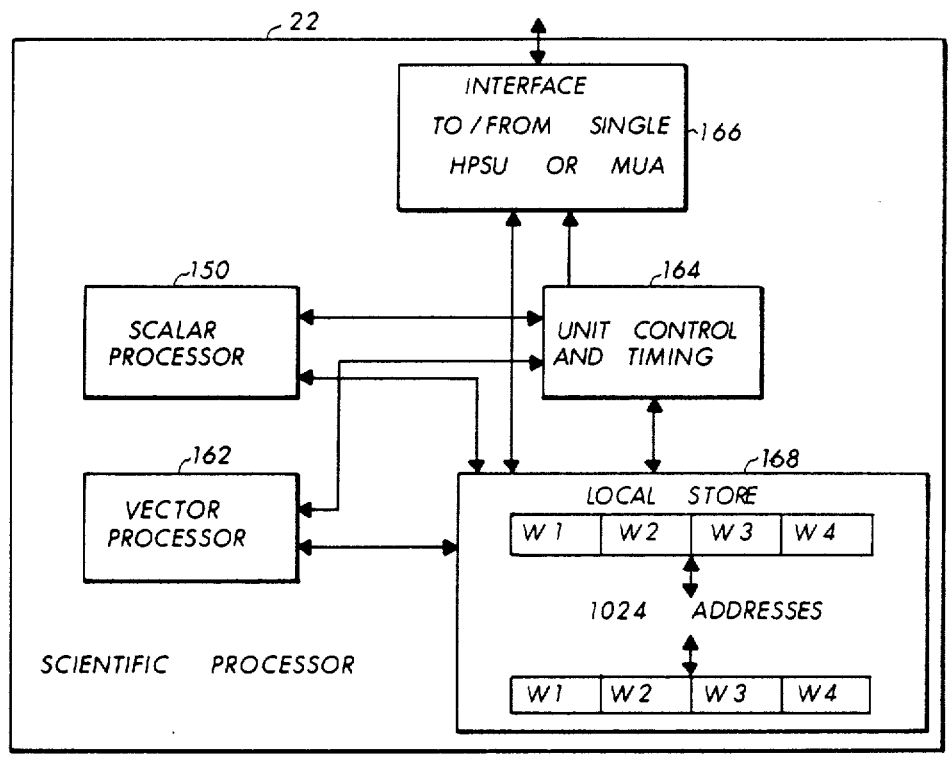
FIG. 4 is a simplified block diagram of the Scientific Vector Processor.

FIG. 4 is a simplified block diagram of the Scientific Vector Processor.

Basically, the SVP 22 is a subsystem defined as an attached processor of the host system. The SVP has been optimized for the high speed execution of floating-point vector arithmetic operations. It is intended to execute user code only and is not intended to run an executive program. It does not require a control program nor does it have any priviledged modes of operation. The SVP includes distinct modules, the Scalar Processor 150, the Vector Processor 162, the Unit Control Timing 164, the Interface 166, and the Local Store 168.

The Vector Processor module 162 performs vector calculations. The Scalar Processor module 150 performs scalar operations, and also has the over-all control function, including instruction fetch and issue. Generally speaking, the Scalar and Vector Processor Modules operate in parallel although some Scientific Processor instructions require both modules to execute.

The Local Store 168 in the preferred embodiment comprises a high speed random-access memory (RAM) of 4,096 words. The arrangement is such that four words W1 through W4 are accessed simultaneously, yielding an addressable range of 1,024 addresses. The Local Store 168 is used primarily for the storage of frequently used scalar variables, and it should be noted as distinguished from the relatively large dedicated memory sections in prior art scientific processors, the minimal storage being rendered sufficient through the coupling to the plurality of HPSUs.

The general system environment and background described with regard to FIG. 1 through FIG. 4 is set forth to indicate the complexity of the data processing system in which the subject invention may be utilized.

In the following description, the frame of reference will be the HPSU, it being understood that each unit coupled to the HPSU, whether it be IOP, IP or SVP, will be designated as a "Requester" thereby indicating a request for access to the memory.

The following listing identifies the named signal according to the number of conductors relative to each type of requester unit. It will be understood that other signal lines may be used for other types of control functions, but are not defined or discussed since they do not add to an understanding of the subject invention.

| HPSU/REQUESTER INTERFACE SIGNALS | | | | |
|---|---|---|---|---|
| | NUMBER OF LINES | | | DIRECTION |
| SIGNAL | IOP | IP | SVP | REQUESTER |
| REQUESTER AVAILABLE | 2 | 2 | 2 | To HPSU |
| HPSU AVAILABLE | 2 | 2 | 2 | From HPSU |
| REQUEST | 1 | 1 | 1 | To HPSU |
| ACKNOWLEDGE 1 | 1 | 1 | 1 | From HPSU |
| ADDRESS | 24 | 24 | 22 | To HPSU |
| ADDRESS PARITY | 4 | 4 | 3 | To HPSU |
| WRITE DATA | 72 | 72 | 144 | To HPSU |
| WRITE DATA PARITY | 8 | 8 | 16 | To HPSU |
| READ DATA | 72 | 72 | 144 | From HPSU |
| READ DATA PARITY | 8 | 8 | 16 | From HPSU |

-continued

| HPSU/REQUESTER INTERFACE SIGNALS | | | | |
|---|---|---|---|---|
| | NUMBER OF LINES | | | DIRECTION |
| SIGNAL | IOP | IP | SVP | REQUESTER |
| FUNCTION CODE | 5 | 5 | 6 | To HPSU |
| FUNCTION CODE PARITY | 1 | 1 | 1 | To HPSU |
| START | 6 | 6 | 0 | To HPSU |
| START PARITY | 1 | 1 | 0 | To HPSU |
| END | 6 | 6 | 0 | To HPSU |
| END PARITY | 1 | 1 | 0 | To HPSU |

F. Activity control

Figure 5A:
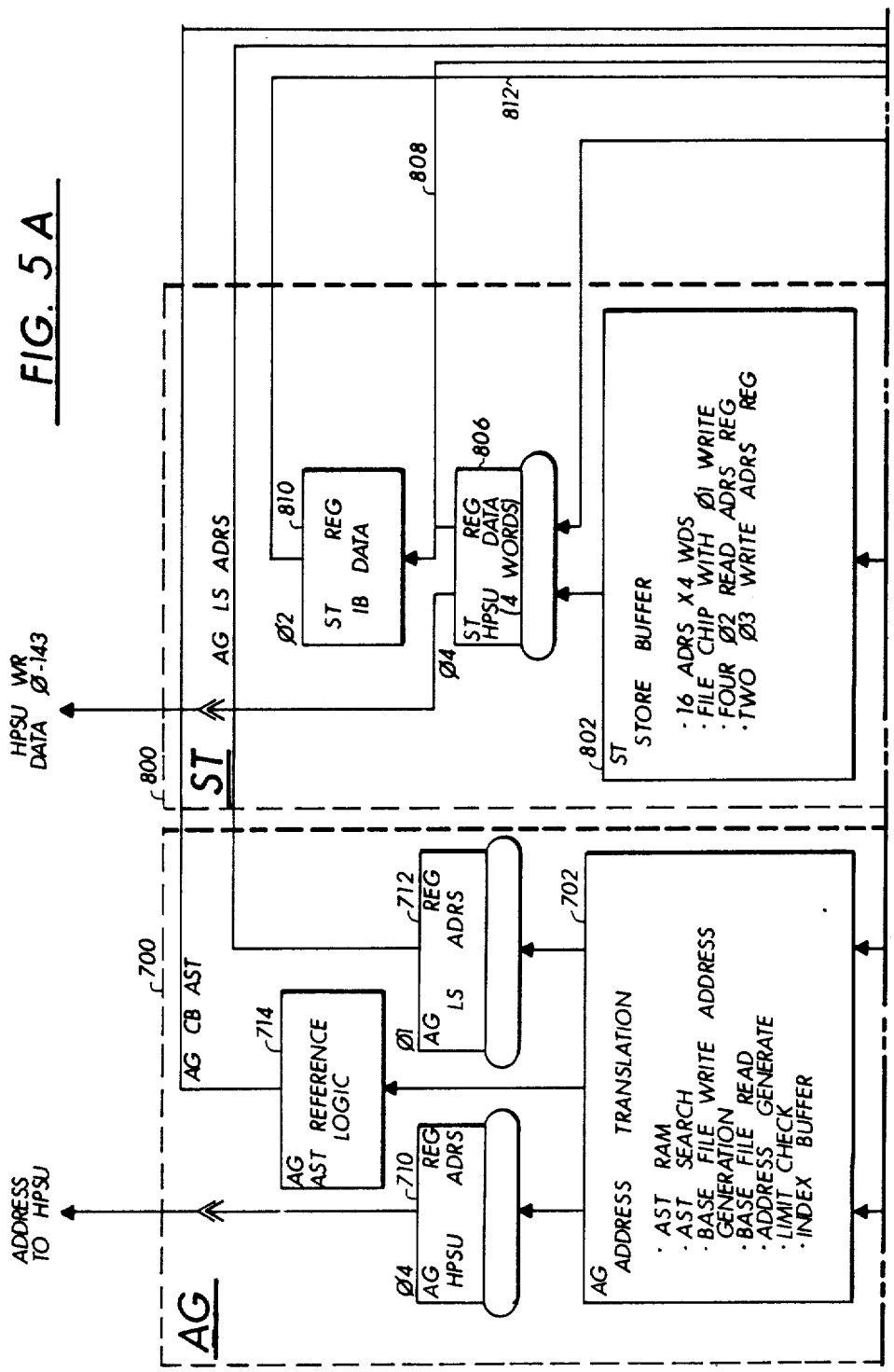
Figure 5C:
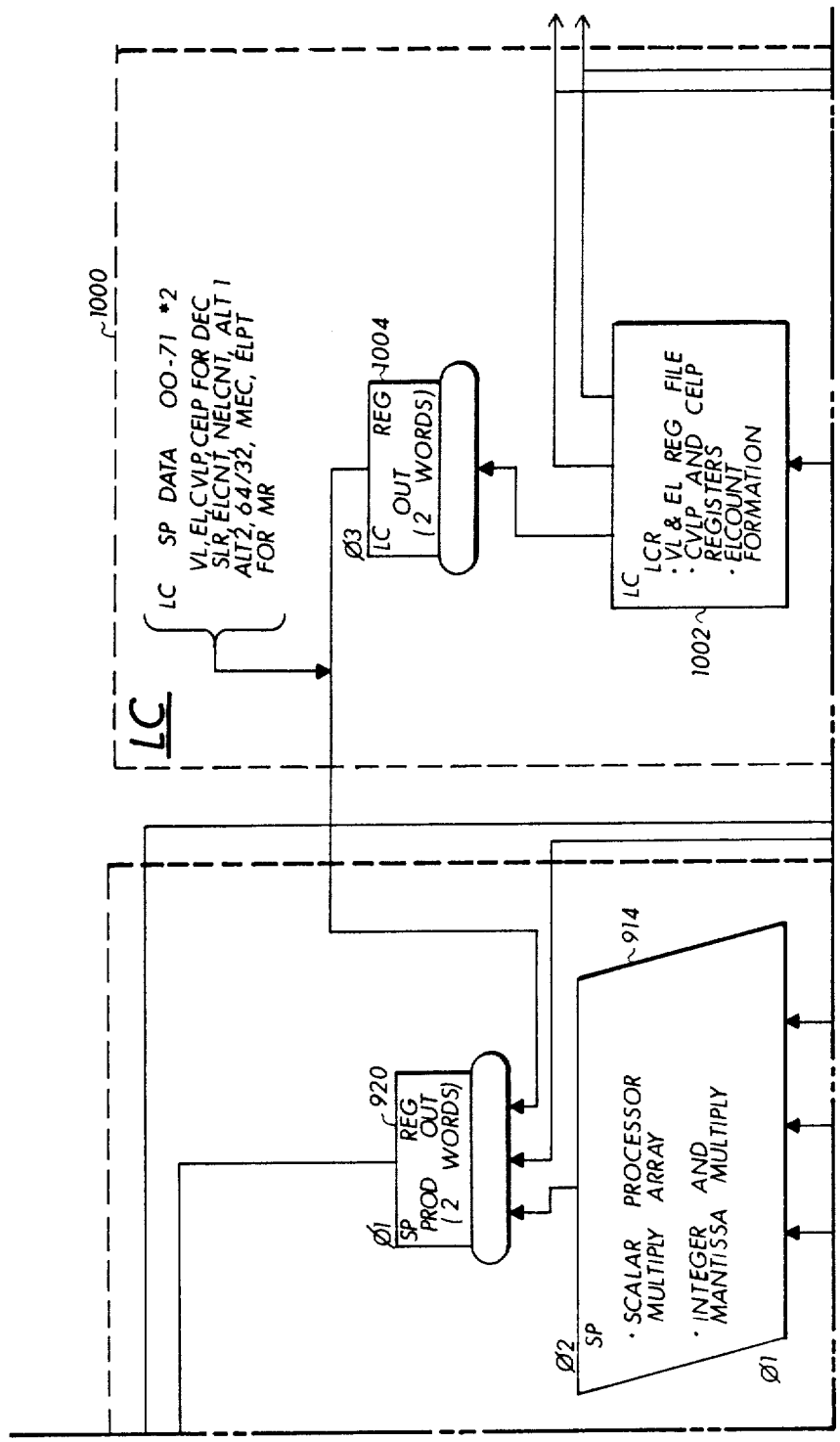
Figure 5:
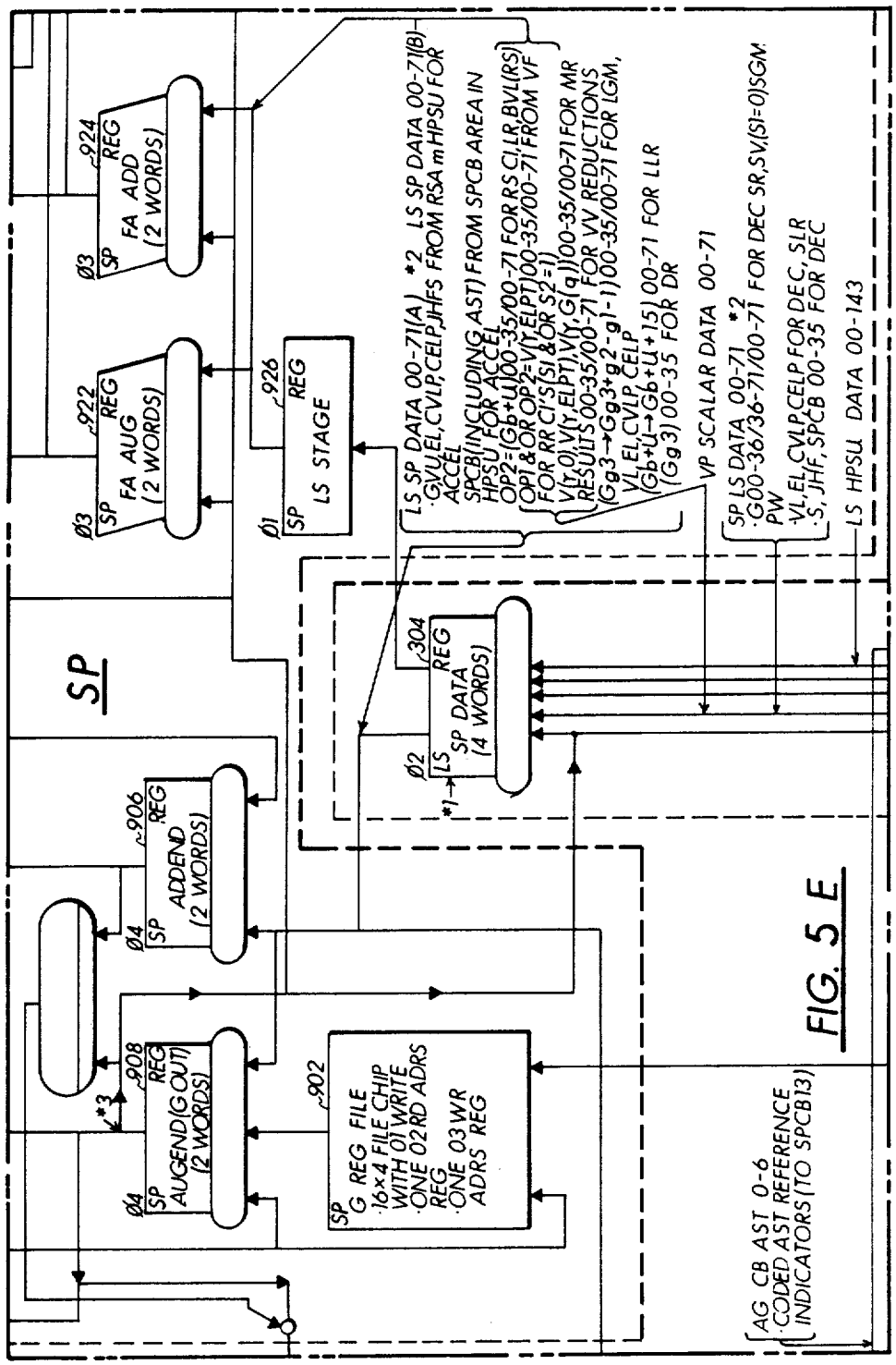
Figure 5G:
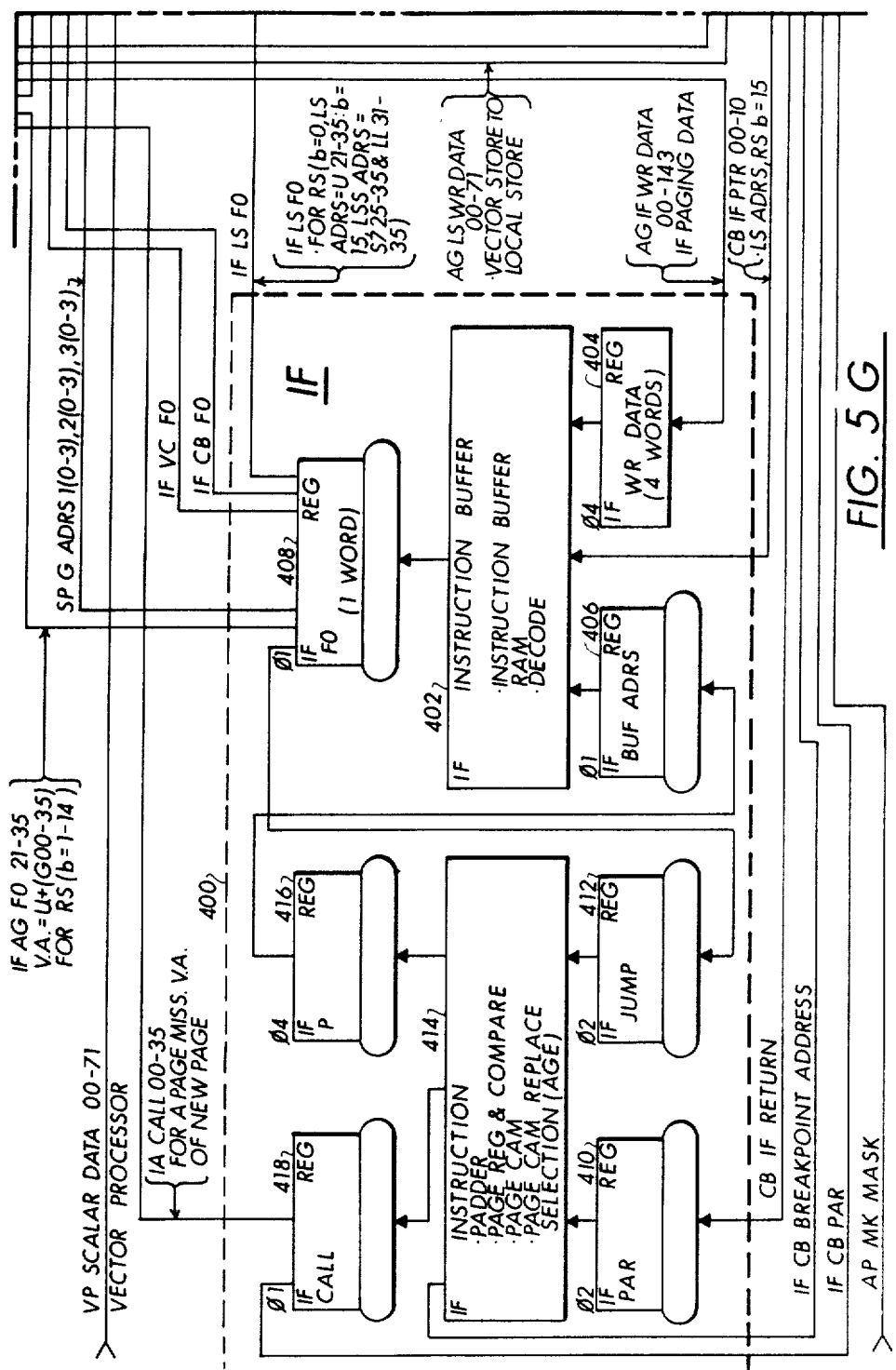
Figure 5H:
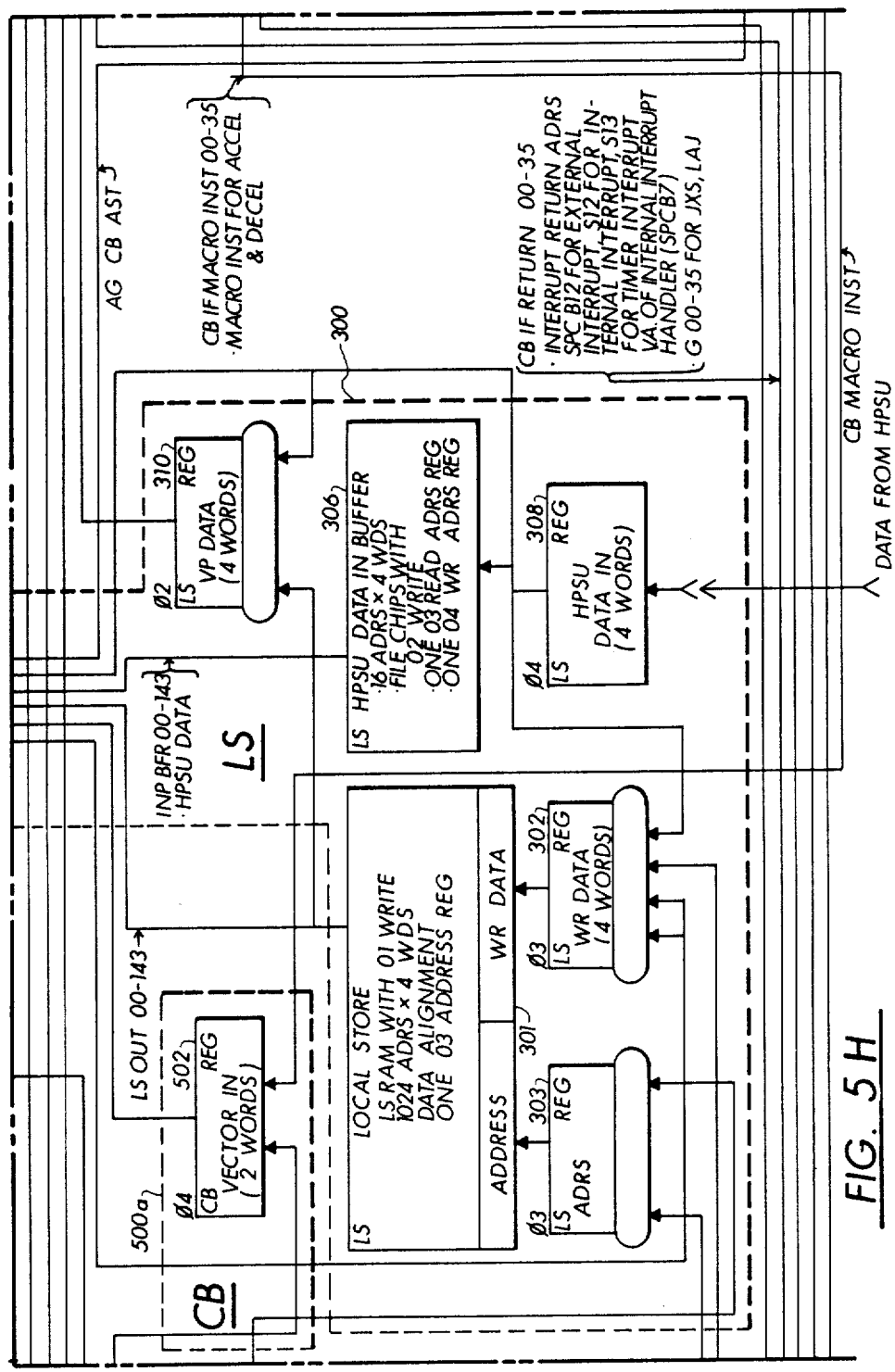
Figure 51:
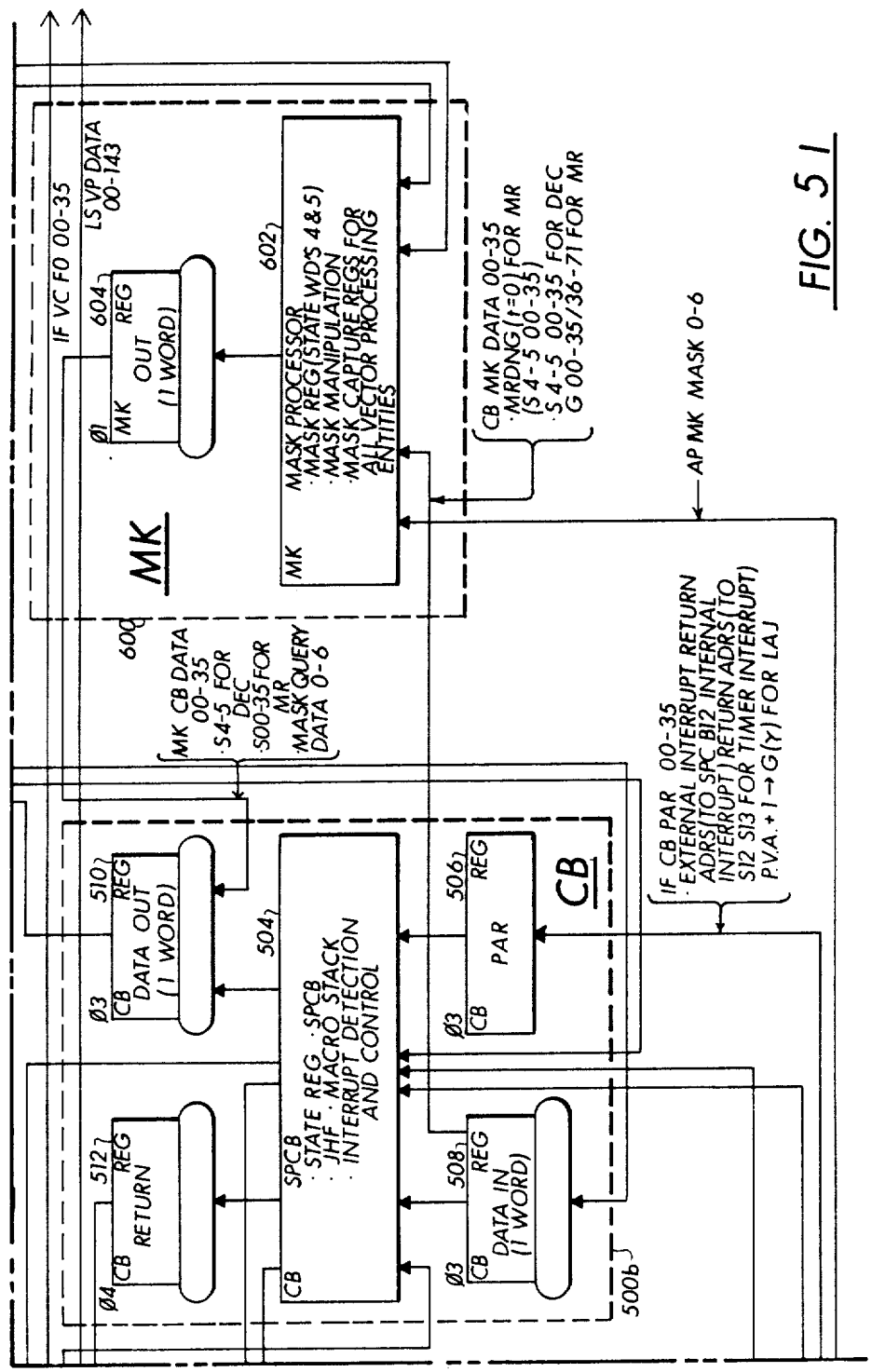

FIG. 5 is an overall detailed block diagram showing the inclusion of the proposed invention into the scalar portion of the Scientific Vector Processor. This scalar processor is more fully explained in copending patent application entitled "Scientific Vector Processor" by J. T. Rusterholz Ser. No. 761,201 and assigned to the same assignee as the present invention. The contents of that application are hereby incorporated into this description by this reference.

Returning to FIG. 5, which includes FIGS. 5A through 5I, positioned as shown, there are basically nine elements of the overall scalar processor which are utilized in this invention. The Scientific Processor Control Block (SPCB) 510 is the first element and it includes the sixteen state registers, the thirty-two registers of the jump history file, the sixteen registers of the control block, the macro stack and the interrupt detection and control section. Second is the G register file 512, third and fourth are the Instruction Buffers (IF) 514, 516. Fifth is the Local Store (LS) 518. Next, are the Loop Control (LC) 520 registers. A Mask Processor (MK) 522 is used to control access to the processor. Address Translation (AG) 524, generates new addresses via a random access memory which includes the activity Segment Table (AST). Finally, a pair of Store Buffers (ST) 526 houses sixteen addresses of four words each and a number of other buffer registers as illustrated.

FIG. 6 is a simplified functional block diagram of these elements as they are used in the inventive system of the over-all data processing system.

The SPCB 510 is shown as including the macro code store 610. At $\phi 4$ of the clock two words enter the SVP control Block (CB), 612. At $\phi 2$ four words enter the Local Store 614 and on the following $\phi 4$, these four words enter the store buffer 616. ST, SI data in the form of words WD0, WD1, WD2 and WD4 from these registers are transferred on the next $\phi 2$ to the store buffer 618. The information is thereafter passed into the registers of the Instruction Flow Control.

These Instruction Flow Controls include the four word write data register 620 which contains the information to be written, the four word HPSU data in register 622 which stores these same four words to be written into the HPSU, and the Instruction Buffer section 514, the latter section including a Random Access Memory (RAM) and a Decoder and provides the necessary buffering of these four words until they can be written into the HPSU.

In the following discussion of the drawings certain abbreviations will be utilized. In this regard, Request is REQ, Address is ADRS, Function is FUNC, Multiplexer is MUX, Enable is EN, Register is REG, Error is ERR, Exclusive-OR is XOR, and an AND function is A.

Figure 7B:
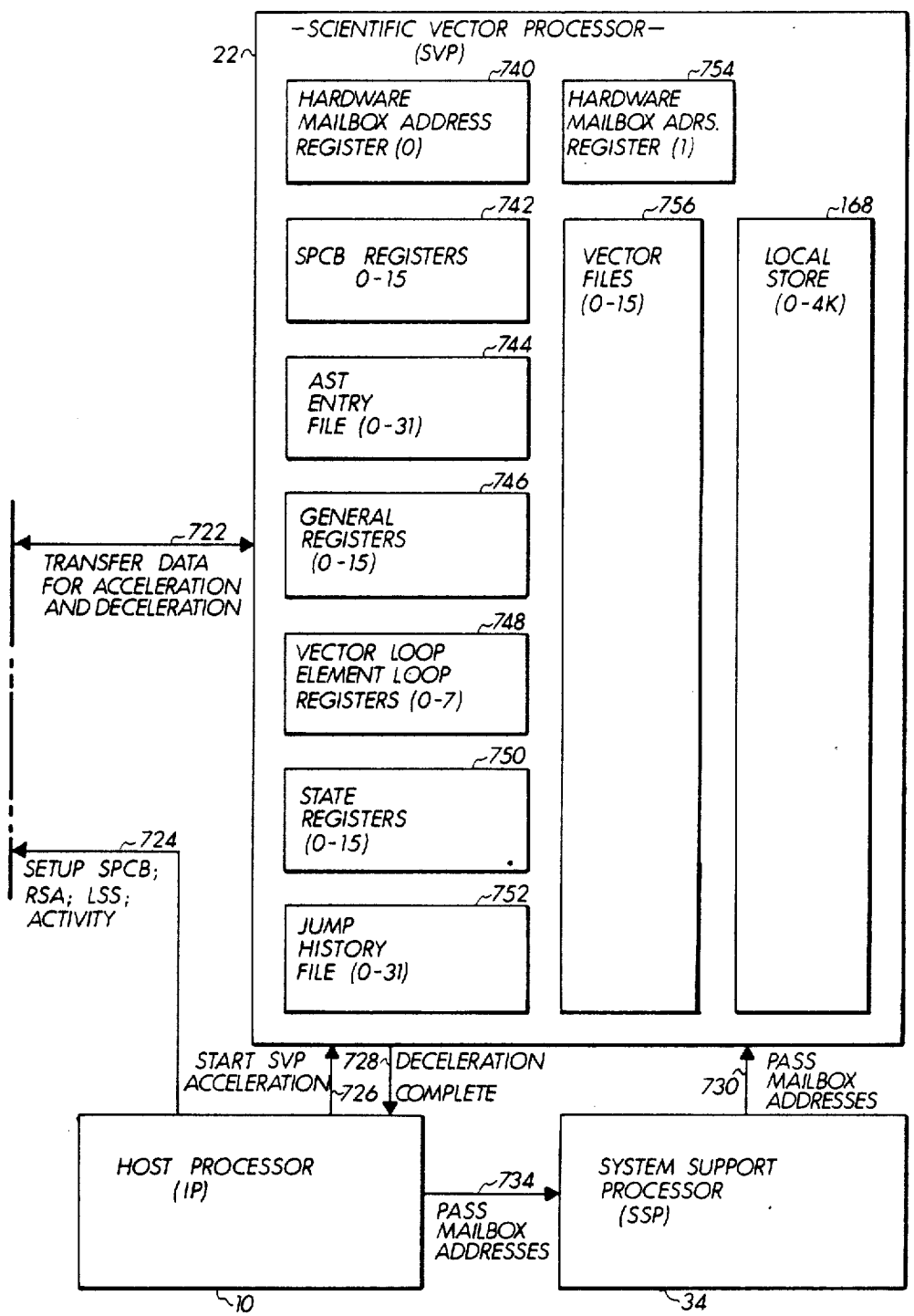

FIG. 7 is a block diagram of how an activity is set up in the HPSU, for SVP execution.

The unit of work that is scheduled for an SVP is called an activity which, of course, is actually a "task" to be executed. The SVP has neither a software control program nor a privileged mode of execution. Therefore scheduling of SVP activities is done by the host and each activity is explicitly dispatched. The host software and the SVP hardware therefore must be aware of the formats of activity control structures, in particular the Mailbox, Hardware Status Registers, and SPCB defined below.

1. Control Structures 1.1 Mailbox Definition

Communication between the host and the SVP makes use of a mailbox 710 consisting of eight words in main storage. There is one mailbox for each SVP, used by all IPs, the read address of which is provided to the SVP via the System Support Processor (SSP) 34 at initialization time. The real address must be on a 16-word boundary. The ability to dynamically redefine the mailbox address to aid automatic reconfiguration is provided. The format of the mailbox is shown in the following Table 1.

| Word: | Bit: | Name and Description of Mailbox Fields: |
|---|---|---|
| 0-1 | 0-35 | Reserved for software |
| 2 | 0-1 | CONTROL CODE. Defined functions are Report Status, Change Mailbox, and Start Activity for codes of 0,1 and 3 respectively. |
| 2 | 2-5 | Reserved (should be zero) |
| 2 | 6-35 | LINK. The real address of either an SPCB or the new mailbox. |
| 3 | 0-1 | CURRENT FUNCTION. Values 0-3 indicate Status Stored, Mailbox changed, Activity decelerated, and Activity executing respectively. |
| 3 | 2-5 | Reserved for hardware |
| 3 | 6-35 | CURRENT ADDRESS. The real address used or being used by the SVP in performing the current function. |
| 4-7 | 0-35 | STATUS. Used by the SVP to store the Hardware Status Registers (HSR0-3). |

When the SVP is prompted by the host to start an activity, mailbox word two is read to the SVP. This real SPCB address in word two then provides a link to all necessary SVP data, since, the SPCB word five has the real address of the Register Save Area, plus the AST entries are contained in the SPCB. The first AST entry has the address and length of the SVP Local Store data.

1.2. Hardware Status Registers 1.2.1 Hardware Status Register 0 (HSR0)

HSR0 contains the External Interrupt Indicators in bits 0-34, and bit 35 is the flag that indicates a pending internal interrupt. The occurrence of each external interrupt condition is reflected by setting the corresponding bit in HSR0. Following are the definitions of each of the 36 bits of HSR0 register.

| Bit | External Interrupt Cause Indicated |
|---|---|
| 0 | Link Address boundary violation |
| 1 | Power loss |
| 2 | SP hardware check |
| 3 | Reserved |
| 4 | Reserved |
| 5 | Reserved |
| 6 | Error on information from storage |
| 7 | Error on information to storage |
| 8 | MUE in storage |
| 9 | Real Address not available |

-continued

| Bit | External Interrupt Cause Indicated |
|---|---|
| 10 | Storage Internal check |
| 11 | Interface Sequence Error |
| 12 | Reserved |
| 13 | Storage Interface Time Out |
| 14 | Reserved |
| 15 | Reserved |
| 16 | An internal interrupt is taken as external |
| 17 | Generate Interrupt (G) instruction |
| 18 | UPI interrupt received WHILE NOT IN FORMANT STATE |
| 19 | Quantum Timer runout |
| 20 | Program Segment alignment or length error |
| 21 | RSA not on correct storage boundary |
| 22 | Local Storage Base address not on correct boundary |
| 23 | Local Storage length granularity incorrect |
| 24 | PAR Address Fault (AST entry not found) |
| 25 | Data Address Fault (AST entry not found) |
| 26 | Address limits error |
| 27 | Storage Protection check - Execute |
| 28 | Storage Protection check - Read |
| 29 | Storage Protection check - Write |
| 30 | Doubleword and Four Word Address not even |
| 31 | Attempted Test and Set/Clear or local storage segment |
| 32 | PAR bits 18, 19 not zero |
| 33 | Reserved |
| 34 | Reserved |
| 35 | (Pending Internal Interrupt Flag) |

1.2.2 Hardware Status Register 1 (HSR1)

HSR1 is used to hold the instruction which caused specific external interrupts.

1.2.3 Hardware Status Register 2 (HSR2)

HSR2 is used to hold status regarding the external interrupt. The first six bits are used to signify the external interrupt type (bit number of HSR0), and the remaining bits contain amplifying information. Once the interrupt type field is set to a non-zero value and status is stored, further interrupts will be recorded in HSR0 but no status stored (i.e., only the status from the first interrupt is stored and retained). Bit 0 of HSR0 has no additional status and does not prevent storing of status for subsequent errors encountered.

1.2.4 Hardware Status Register 3 (HSR3)

The first thirty bits (0–29) are an extension of HSR2. Bit 30 is the LAJ Indicator and bits 31–35 are the Jump History File pointer.

1.3. Scientific Processor Control Block Format

SVP activities are executed under the control of a Scientific Processor Control Block (SPCB). Each SPCB contains all the information (or pointers to the information) needed to execute an activity on an SVP.

The format of an SPCB is defined by the table below.

| Word | Bits | Contents |
|---|---|---|
| 0–3 | 0–35 | Unassigned (reserved for software) |
| 4 | 0–35 | Reserved for hardware |
| 5 | 0–5 | Unassigned |
| 6 | 6–35 | Real Address of Register Save Area |
| 6 | 0 | Speed Control Bit |
| 6 | 1–30 | Unassigned |
| 6 | 31–35 | AST Length. Number of valid entries minus one |
| 7 | 0–35 | Virtual Address of Internal Interrupt Handler |
| 8 | 0–35 | HSR0 DATA |
| 9 | 0–35 | HSR1 DATA |
| 10 | 0–35 | HSR2 DATA |
| 11 | 0–35 | HSR3 DATA |
| 12 | 0–35 | PAR: Program Address of next instruction |
| 13 | 0–30 | AST: Referenced Indicators |
| 13 | 31–32 | Reserved for hardware |
| 13 | 33–35 | Acceleration/Deceleration Status |

-continued

| Word | Bits | Contents |
|---|---|---|
| 14 | 0–35 | Reserved for hardware |
| 15 | 0–35 | Quantum Timer |
| 16–143 | | Activity Segment Table |

Words 0–3 of the SPCB must remain available to the host. Words 4–7 may be accelerated, but need not be decelerated since the SVP should never alter them. In order to simplify activity-switching hardware, it is required that the SPCB be located on a 16-word real address boundary.

1.3.1 Activity Segment Table

1.2.1.1 AST Format

Each activity has an Activity Segment Table (AST) 712 that resides in the SPCB, and defines the addressing environment available to the activity. Each AST entry is four words in length. The number of entries in a particular AST is restricted to a maximum of 32, and is specified by word 6, 712 of the SPCB. The format of an AST entry is:

| | | |
|---|---|---|
| 0 | 0–17 | Lower Segment Name (LSN) |
| 0 | 18–35 | Upper Segment Name (USN) |
| 1 | 0 | Execute Permission |
| 1 | 1 | Read Permission |
| 1 | 2 | Write Permission |
| 1 | 3–5 | unassigned |
| 1 | 6–35 | Base real address |
| 2 | 0–5 | unassigned |
| 2 | 6–35 | Length of segment in words, minus one |
| 3 | 0–35 | reserved |

1.3.1.2 AST Usage

Instructions that refer to main storage do so by specifying the number of a general (G) register 512, and in some cases an immediate offset. In any case, the named G register is assumed to contain a full 36-bit virtual address. The immediate offset is restricted such that it may not cause the resultant virtual address to fall outside the segment of the unaugmented virtual address. Specifically, both the augmented and the unaugmented addresses must be translatable by the same AST entry. Used in this fashion the G registers are made to function essentially as base registers.

The AST provides the information for translating virtual addresses for purposes of referencing main storage. Given a 36-bit virtual address, the left 18 bits of it are defined as the Segment Name (SN). To translate the virtual address, the AST is searched until an entry is found such that LSN≦SN≦USN. If no entry in the AST satisfies this condition, then an addressing fault interrupt is caused. A properly constructed AST should never contain more than one entry satisfying this condition. Once the proper AST entry is found, a 36-bit quantity called the Virtual Segment Offset (VSO) is calculated by substracting LSN from the left bits of the virtual address. The real address for the reference is then given by Base+VSO. However, before the reference itself can be made, the permission bits must be inspected and the VSO must be less than or equal to the value in the length field. Failure to pass these checks causes the appropriate error interrupt.

1.3.1.3 AST Indicators

Word 13 of the SPCB contain 31 indicator bits, each one corresponding to one of the 31 possible AST entries ignoring the first entry, which always defines local storage. Whenever a particular AST entry is successfully used to perform a translation, the corresponding indicator bit is set to a one. Other bits remain unaltered. Each AST entry defines the translation for a contiguous block of the virtual address space. Such a block may cover more than one segment as the term segment is used in the context of the host translation process. However, since the entire block must be handled as a single entity, the term segment is used in the following discussions to refer to the entire block, whatever its size.

1.3.1.4 Local Storage Mapping

The first entry of the AST is used to define the addressing space of Local Storage 518. Therefore it has certain special restrictions applied to it:

The length must be a multiple of 32 words, i.e., the least significant five bits of the Length field must be ones.

The Base real address must be on a 16-word boundary, i.e., the least significant four bits must be zeroes.

The permission bits are ignored, and implied values of 011 are used. (Read and write, but not execute.)

G. Local Storage

1. Description

For the purpose of providing fast access to scalar operands, the SVP employs a large internal storage facility called Local Storage 518. Physically this is a fast, random access storage of some reasonably large number of words (4K is suggested). When an activity switches onto the SVP, the segment defined by the first AST entry is loaded into the Local Storage. Because the data is maintained within the SVP, it is not shared or sharable among activities.

2. Local Storage Addressing

Local Storage is specified in one of three ways: (1) directly, using an absolute Local Storage address from the instruction, (2) indirectly, by specifying a full virtual address that maps into Local Storage, i.e., is translated using the first AST entry, or (3) as the current frame of the automatic storage stack.

Length checking is applied to all references to the Local Storage segment, whether the reference is directed to the physical local storage or the main storage, and regardless of the method of specification. Failure to pass this check results in an address limits error interrupt.

2.1 Automatic Storage Stack

An SVP activity may set aside an area of local storage for temporary values (automatic storage) to be managed as a stack. The Local Storage Stack definition word defines the area. Instructions in the RS format have an option (b field=15) that allows them to access locations in this defined area. Specifically, the Local Storage address, is formed by catenating the five rightmost bits of the instruction u field on the right of the 11-bit pointer (PTR) value taken from state register 7 (S7) 510. This forms the 16-bit direct offset into the local storage segment. The PTR, along with the upper and lower limits for it, are maintained in register S7. The format of this word comprises three eleven bit segments referred to as the Upper Bound (UB) the Lower Bound (LB) and the Pointer (PTR). Bits 1-11 are the UB bits, bits 13 to 23 are the LB and bits 25-35 the Pointer.

Instructions are provided to increment and decrement the PTR, checking it against the appropriate limit.

Note that the stack effect occurs on a frame basis, not on a word basis. For each value of the PTR, a block of 32 words is available via this mechanism. Changing PTR makes available a different 32-word block.

The Stack definition word is not protected, and its contents can be changed freely by the activity. Also the local storage area described by the stack definition word is not protected and can be accessed by the other local storage addressing mechanisms.

3. Local Storage Acceleration

When an activity is switched onto the SVP, the values in the first AST entry, which defines the local storage segment, are checked. If the Base and Length fields do not meet the constraints previously given then an interrupt is caused. If they are valid, then the local storage segment, or as much of it as fits, is loaded into the internal local storage 518 shown in FIG. 5.

If the length of the segment is less than or equal to the amount of physical internal storage available, then the entire segment is loaded there, and all references to the segment are directed to the internal storage. If the segment length exceeds the internal storage available, then the internal storage is filled, beginning at the start of the segment. References to the first part of the segment are handled internally, but references beyond this length are directed to the appropriate place in main storage.

When the activity is switched off, the same amount of storage that was accelerated is copied back to main storage. No attempt is made to update this main storage area while the activity is executing on the SVP.

H. Performance Acceleration Devices

Referring to FIG. 5 again, performance acceleration devices are hardware mechanisms that speed up access to architectural objects while remaining architecturally invisible. The following descriptions cover the functional aspects of the primary Processor performance acceleration devices.

1. Local Storage 518

Each Processor will include a high speed storage of 4K words of RAM referred to as Local Storage. This storage is primarily for the storage of frequently used scalar variables in a program. Its location in the Scalar Processor Module (SPM) ensures that it can be accessed fast enough to keep the Scalar unit busy. Local Storage is not shared between other Processors or with the host system.

2. Virtual Machine Address to Real Address Translation Bypass, 524.

Address translation accelerates the Virtual Machine (VM) Addressing by bypassing the address search in the Activity Segment table. This is accomplished by using sixteen Read (R) registers, which relate directly to the sixteen General (G) registers. When the Processor is initialized for an activity all the R registers are invalidated. The first translation of a virtual address in a G register loads the related R register with the real address translation. Subsequent virtual to real address translation requests to the G register will bypass the translation process and select the real address from the associated R register. This will always be the procedure as long as the Valid indicator is set. A clearing of this indicator (invalidation) will take place if the related G register is changed by any instruction except a Scalar Add or Substract in the RS instruction format. If either of these two instructions is executed on a G register, the same operation is performed on the R register so it remains valid. The length checking of these addresses is done at the time they are changed.

3. Instruction Buffer, (514)

All address requests from Program Address Register (PAR) for an instruction are made to an internal Instruction Buffer with an access time of one clock cycle.

The Instruction Buffer is a 4K cache memory containing up to 16 pages of data loaded from the HPSU during normal activity progression. All instruction requests are checked against a Content Addressable Memory (CAM) that holds a record of all pages currently resident in the Instruction Buffer. An instruction address request resident in the last page referenced from the Instruction Buffer will make that instruction, and all consecutive requests to that page, available in one clock cycle. A request for an address resident in an Instruction Buffer page that was not used for the last instruction request will be delayed for one clock cycle and then all consecutive requests to that page will also be available at the single clock cycle rate.

An instruction request not resident in one of the pages currently stored in the Instruction Buffer will generate a Page Miss and require a HPSU request for that page thru the Address Generation (AG) section of the SPM. The single address request that generated the Page Miss will cause the page in the HPSU containing that address to be loaded into the Instruction Buffer on a First-In First-Out (FIFO) basis if current page residency has exceeded 16. (Pages are loaded consecutively from 0–15. The last used page is never overwritten if it is the current page selected for paging).

Detected Instruction Buffer load failures cause one automatic retry to be attempted.

I. Interrupts

Interrupts occurring on the SVP can be classified into two categories depending on whether they can be handled entirely on the SVP. Certain contingencies such as non-recoverable program faults and hardware errors must be handled by a host IP. Others such as arithmetic overflows and divide faults may optionally be handled on the SVP. Those in the former class are called external interrupts. The latter, internal.

Response to an external interrupt consists of switching out the activity (deceleration). The process of decelerating state stores a status word indicating the cause of the interrupt into HSR0, and additional status is placed in HSR1-3. The return address PAR value is stored into SPCB word 12. When an activity is switched (J.) onto an SVP (acceleration) it always begins executing at the address in SPCB word 12.

Response to an internal interrupt is determined by the Internal Interrupt Control Mask located in the State registers. There is a set of sixteen 36-bit State registers, called S0-S15 respectively which contain program-visible state relating to internal interrupts, condition codes, etc. Each possible internal interrupt cause is represented by a 2-bit field in the mask.

The mask values are further detailed below. Basically, they allow each interrupt to be (a) ignored, (b) taken as if it were external, i.e., by causing an activity switch, or (c) taken internally. In the third case the response is essentially a forced branch to the virtual address contained in SPCB word 7. This is the address of the internal interrupt handler. The return address is saved in register S12 or S13.

State register S11 contains the Internal Interrupt Control Mask. For each of the interrupts there are two bits in the mask word, which together control how the interrupt is to be handled. Mask bits i and i+18 control internal interrupt i as follows:

| i | i + 18 | Interrupt Response |
|---|--------|-------------------|
| 0 | 0 | Ignore entirely |
| 0 | 1 | Cause asynchronous external interrupt |
| 1 | 0 | Cause synchronous internal interrupt |
| 1 | 1 | Cause synchronous external interrupt |

Interrupts are identified by Interrupt Indicator bits, each of which is associated with a particular interrupt cause, and whose one set state indicates the presence of that cause. HSR0 contains the External Interrupt Indicators, and register S8 contains the Internal Interrupt Indicators.

Following are Internal Interrupt Indicators, which occupy State register S8.

| Bit | Internal Interrupt Cause Indicated |
|-----|------------------------------------|
| 0 | Interval Timer Runout |
| 1 | Instruction Breakpoint Compare |
| 2 | Local Storage Stack Overflow |
| 3 | Local Storage Stack Underflow |
| 4 | Undefined Instruction |
| 5 | Vector Register Length Overflow |
| 6 | Divide Fault |
| 7 | Integer Overflow |
| 8 | Floating Characteristic Overflow |
| 9 | Single-Precision Characteristic Underflow |
| 10 | Double-Precision Characteristic Underflow |
| 11 | Data Breakpoint Compare - Read |
| 12 | Data Breakpoint Compare - Write |
| 13–17 | Reserved for additional internal interrupts |
| 18–29 | Reserved |
| 30–35 | (Element index status) |

When any interrupt occurs tht is not to be ignored, further issuing of instructions is suspended, and any other operations in process are allowed to finish. When a quiescent state is reached, the interrupt indicators are examined. If there is only one interrupt present, then the appropriate status is stored and the interrupt is taken as described above.

It is conceivable that more than one interrupt could be indicated. That would result if a second interrupt arose while trying to complete the other operations, or if an interrupt from an outside source (e.g., UPI) happened to coincide with one generated locally. If there are only internal interrupts, their status is stored and the branch is made as if there are only one. It is the responsibility of the interrupt handling software to test the indicators to determine the number and identity of the interrupts. If all interrupts are external, operation is analogous except that, of course, an activity switch occurs. (J.)

Should both internal and external interrupts be present, both internal and external status and indicators are set. In addition, bit 35 of HSR0 (Pending Internal Interrupt flag) is set and the external switch is taken. Upon being switched back in at a later time the flag is checked by the SVP before executing any instruction. If set, the internal interrupts are then taken and the flag is cleared by the hardware.

Note that in all cases the Interrupt Indicators must be cleared out by software handles. When an activity is switched onto an SVP, word 8 of the SPCB is tested. If any bit 0–34 is set, the external interrupt is immediately taken, causing the activity to be switched back out without executing any instruction. If bits 0–34 are clear but bit 35 is set, the internal interrupt is taken as described above. The Internal Interrupt Indicators (S register word 8) are not tested by the SVP hardware. They themselves do no cause interrupts but are merely status bits set by hardware for use by software.

J. Activity Switch

1. Hardware Control States

There are seven hardware control states that the SVP may reside in, depending on the particular internal condition. Table 2 outlines these states.

TABLE 2

| STATE | FUNCTION |
| --- | --- |
| DORMANT | NON-EXECUTING MODE WHERE MONITORING FOR A UNIVERSAL PROCESSOR INTERRUPT (UPI) IS DONE TO BEGIN AN ACTIVITY. |
| EXTERNAL | STATE TRANSITION DECISIONS ARE MADE |
| ACCELERATE | See Activity Switch 1.1 |
| DECELERATE | See Activity Switch 1.2 |
| INTERNAL | HANDLES INTERNAL INTERRUPTS |
| EXECUTE | ACTIVITY IS EXECUTED |
| INOPERATIVE | ENTERED WHEN FATAL ERRORS ARE DETECTED AND CAN ONLY BE EXITED BY A POWER-UP CLEAR SIGNAL. |

1.1. Acceleration

As shown in FIG. 7, when no activity is being executed, the Processor remains in the Dormant state until a Universal Processor Interrupt is received from the IP 726. Upon receipt of the UPI, the Processor begins loading a new activity that is scheduled by the IP 724. Communication between the Processor and its host is accomplished through the mailbox 710. The two most significant bits in word two of the mailbox indicates whether an activity is to be accelerated 710. If these bits are both set, the Processor takes the new activity address from word two of the mailbox and begins loading data 722. If the bits are both cleared the Dormant state will be reentered. The following three items will be loaded for a new activity.

1. RSA (Register Save Area), 714
   a. General Registers, 746
   b. State Registers, 750
   c. Loop Control Registers, 748
   d. Vector Files, 756
   e. Jump History File, 752
2. SPCB (Scientific Processor Control Block), 742
   a. SPCB Words 4-15,
   b. Activity Segment Table, 744
3. Local Store After completing these loads the Processor will begin executing. Should any hardware errors occur while acceleration is being done, the acceleration state will immediately be aborted.

1.2. Deceleration

The Processor will continue to execute an activity until an External interrupt is encountered. This interrupt will force the Processor to decelerate, which stores all pertinent data back to the HPSU, 722.

There are five possible sources of interrupts:

1. Generate Interrupt instructions executed when an activity is completed.
2. UPI from the host to abort an activity, 810.
3. External interrupt caused by a fault.
4. Internal interrupt that was masked to be handled as an External interrupt.
5. Internal interrupt handler that issues a generate interrupt instruction.

The data registers and files that will be stored to the HPSU during deceleration are the same as loaded during (740-752; 756, 168) acceleration except the Activity Segment table and SPCB 4-7 are not decelerated. HSR0-3 (SPCB 8-11) are copied into mailbox words 4-7, 710.

When deceleration is completed 728, the Processor enters the Dormant state.

Hardware errors (Parity and HPSU Interface errors) that are detected during deceleration will cause the deceleration instruction to be aborted and only the SPCB (words 8-15) registers will be stored in the original SPCB and mailbox area in the HPSU.

2. Macro Code Loading

FIG. 6 illustrates how macro code is used to accomplish acceleration, deceleration, and control of the transition to the other operational states of the Processor. The macro code consists of instructions from the Instruction repertoire and is loaded into a RAM 610 of FIG. 8 during SSP initialization.

As shown in FIG. 8, a Universal Processor Interrupt (UPI) 810 signal causes the code to be moved from this RAM to the Instruction Buffer 832.

Figure 11A:
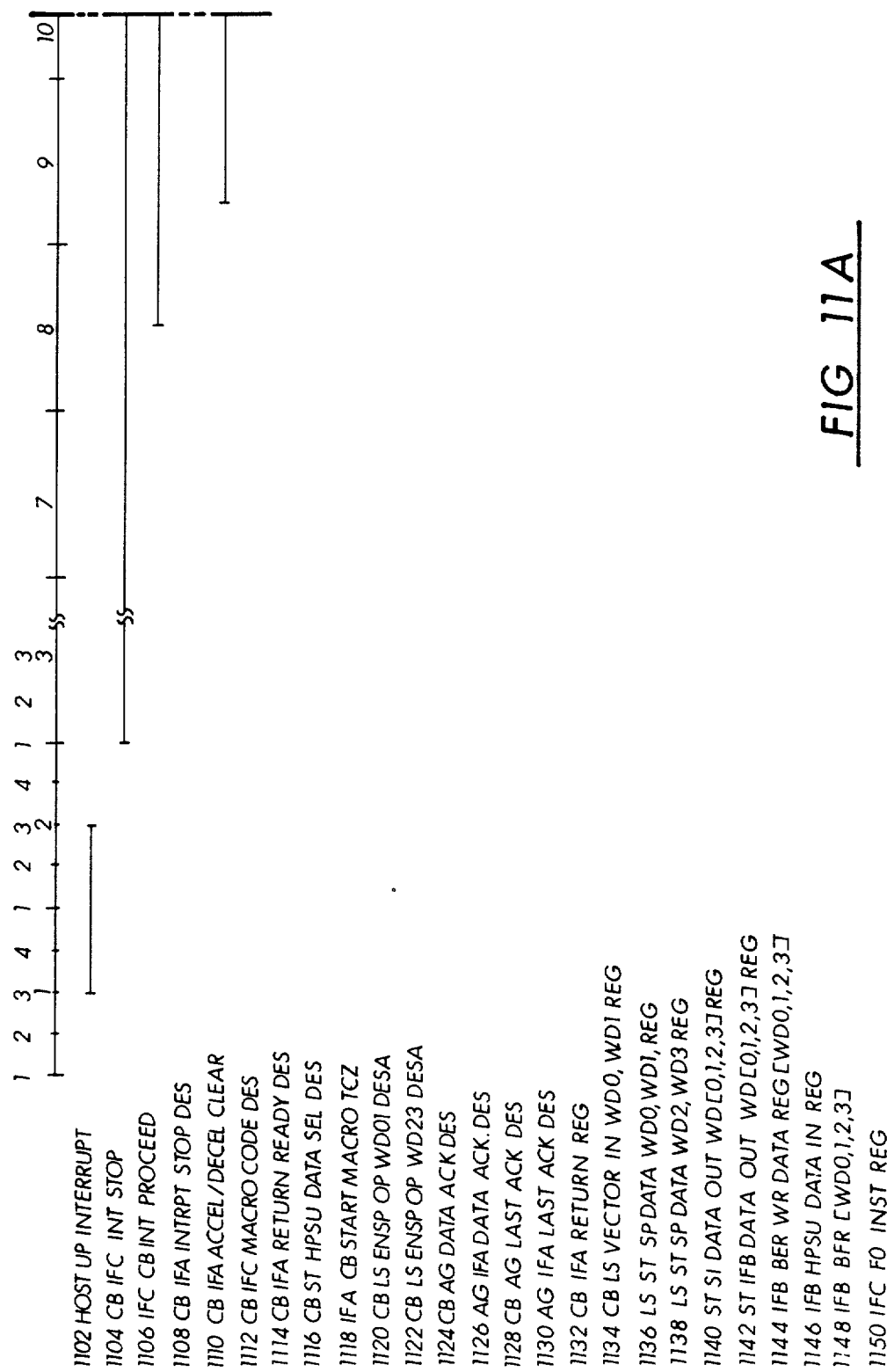
FIG. 11 includes FIGS. 11A, 11B, 11C and 11D and illustrates a timing diagram of the operations from the initial interrupt signal to the transfer of the 256th word into the instruction register.

The data path for moving the macro code is shown in FIG. 6, while the control signals are shown in FIG. 11, which will now be discussed.

The sequence is started by the host sending the SVP an UPI instruction 1102. This will cause the Macro Clock Control 812 to stop all SVP processing 1104 to insure that there is no destruction of the data. The macro code control must then wait to be notified 1106 that all processing has ceased. The MCC is then able to clear out the Content Addressable memory (CAM) 1110 in Instruction Flow Addressing portion 516 (IFA) so no executable pages of code would be resident in the Instruction Buffer 514. The reason for this, is that the macro code will be loaded to the instruction buffer with the same mechanism as used for loading a page of execution code from the HPSU. So if the CAM is cleared the page for macro code can not be accidentally found and the load aborted.

When the clear operation is completed, the MCC then starts a page load 1114 which the Instruction Flow Control 516 (IFC) knows is a macro code load because of the MCC sending a special control line 1112. MCC also sets up the data path 1116 from macro codes store (MCS) 610 to the Instruction Buffer.

When the IFA is ready to accept macro code the MCC is notified 1118. The MCC then starts incrementing the address to the MCS, transferring two words of macro code to the Vector In Register 1134 each cycle. From there four words are aligned in the SP Data Register 1136, 1138 every two cycles by control signals from MCC 1120 and 1122. The data path through the ST HPSU Data Register 616, 1140, the ST IB Data OUT Register 618, 1140, 1142, the WR Data Register 620, 1144 and the IF HPSU Data IN Register 622, 1146 are four words wide.

Instruction Flow is notified of the data that is to be written into the Instruction Buffer by MCC 1124, 1126. MCC also controls when the load is complete 1128, 1130. After completing the load, the macro code is executed from the Instruction Buffer 1150.

The macro code is also moved to the Instruction Buffer when an External Interrupt 810 is detected by the Macro Code Control 812 while the Processor is in the execute state.

The macro code will remain in the Instruction Buffer until the execute state is reentered, which then causes the activity instructions to over write the macro code.

3. Macro Code Instructions

As stated above, the macro code is comprised of Instructions from the Instruction repertoire. In addition, special instructions were included in the hardware to allow: (1) data transfer to/from the SVP Local Store and the SPCB registers, the Jump History file and the S-registers, (2) Block transfers to/from the HPSU to/-from Local Store (3) dynamically changing the mailbox pointer register (4) special control signal generation for acceleration and deceleration. These special instructions are not user visible.

4. Activity Algorithm

4.1. General Description

Initially an SVP is in a dormant state in which it executes no instructions and makes no storage references. To place an activity onto a dormant SVP, the host sets up the appropriate activity data structures FIG. 7, places the SPCB real address into mailbox word 2 with a control code of 3, and signals the SVP via the Universal Processor Interface (UPI). Upon receipt of the UPI interrupt the SVP reads the mailbox and proceeds to switch in and execute the activity. It continues executing until the occurrence of an external interrupt. (In the context of SVP interrupts external and internal refer not to the interrupt source, but to the type of response required). At that point the SVP commences to decelerate and that activity notifies the host processor via the UPI, and returns to its dormant state.

4.2. State Transitions

An operational SVP has two stable states, executing and dormant, and a transitory state of activity switching. Activity acceleration and deceleration are considered components of activity switching for this discussion, and the handling of internal interrupts is considered to occur within the executing state.

The SVP leaves the dormant state only upon receipt of a UPI interrupt. This causes it to go into the switching state (external), where it performs one of several functions as directed by the control code that it reads from word 2 of the mailbox. If the code specifies activity start (code=3), and no errors or interrupts are encountered, the SVP will accelerate the activity and proceed to the executing state. For other control code values, or upon encountering errors or interrupts, the SVP stores its HSR contents to mailbox words 4-7, sends a UPI interrupt to the host, and returns to the dormant state. Details of the switching state are defined below.

In the executing state the SVP fetches and executes instructions in the fashion of a traditional stored-program computer. The program virtual address is mapped in SPCB word 12, and control proceeds through advancing addresses unless altered by a jump or interrupt. An external interrupt halts instruction processing and causes the SVP to go to the switching state for activity deceleration and status reporting.

Initial Program Load (IPL) and Reset Clear signals directed to the SVP may be received at any time regardless of the state of the SVP. Response to these signals always takes precedence over normal state switching. The SVP responds by immediately ceasing all storage references, clearing itself internally including the HSR's, and becoming dormant.

4.3. Switching State Algorithm

In general, the host controls operation of the SVP by placing a control code and associated address into mailbox word 2 and sending a UPI interrupt to the SVP. The SVP indicates its response by writing its current function code and address into word 3 of the mailbox. Each time the SVP completes a function, it copies its HSR contents to mailbox words 4-7, sends a UPI interrupt to the host, and enters the dormant state. The control codes for mailbox word 2 are:

| Code | LINK field | SVP Function |
|------|------------|--------------|
| 0 | not used | Report Status (HSR's) to mailbox 4-7 |
| 1 | new MB real address | Change mailbox address to new value |
| 2. | not used | reserved |
| 3 | SPCB real address | Process activity at this address |

The current function codes for mailbox word 3 are:

| Code | Address field | Function Indicated |
|------|---------------|--------------------|
| 0 | undefined | Status has been stored |
| 1 | new MB real address | Mailbox has been changed to new address |
| 2 | SPCB real address | Activity has been switched out |
| 3 | SPCB real address | Activity has been switched in |

Note that if the SVP is not dormant when it receives a UPI interrupt, it does not read mailbox word 2, but it will still react to the UPI interrupt, eventually becoming dormant. Since UPI interrupts serve both to start and to stop SVP activities, host software must keep track of SVP state.

Figure 12A:
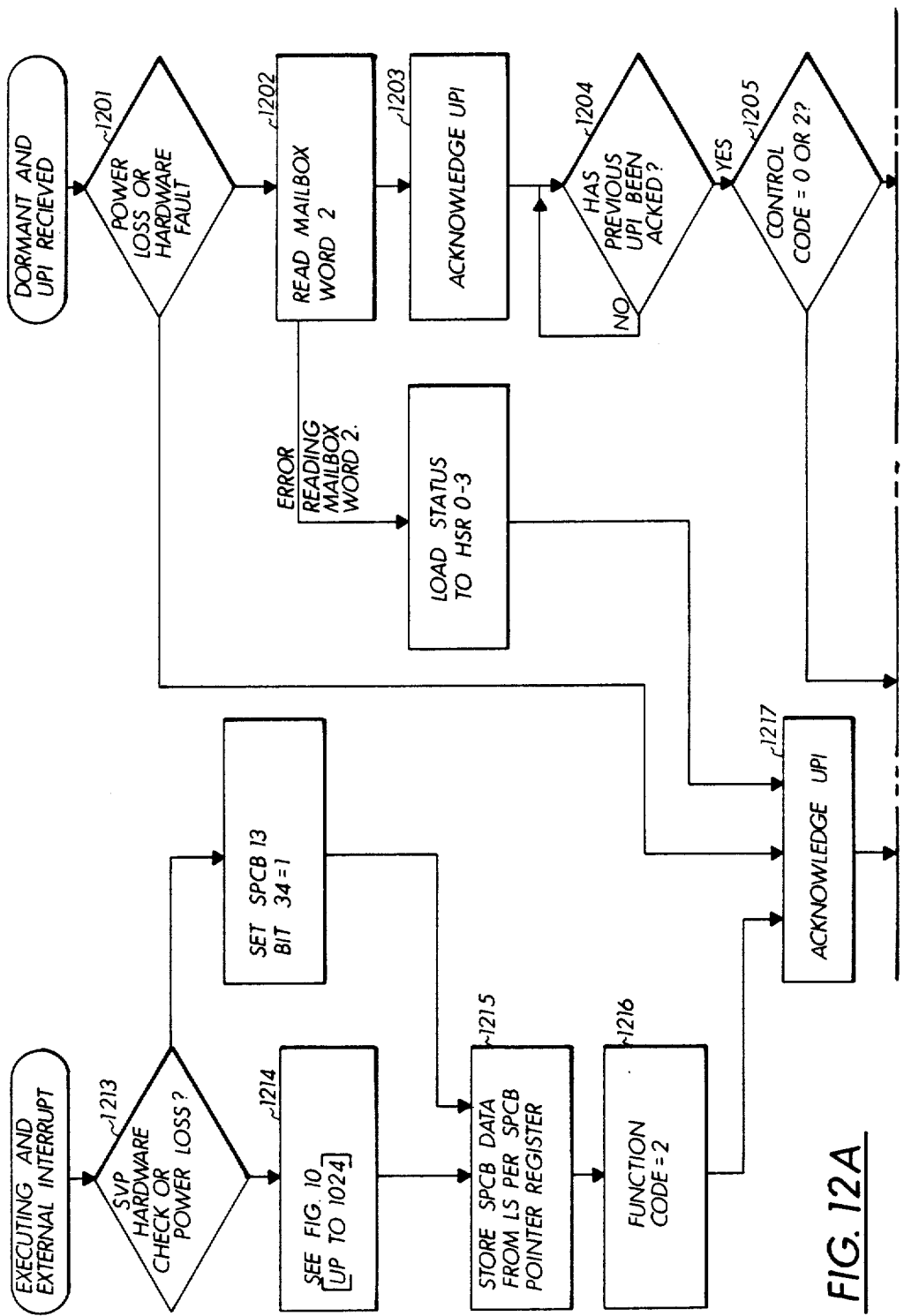
FIG. 12 includes 12A and 12B represent a flow diagram for the activity switch algorithm.
Figures 12, 12B:
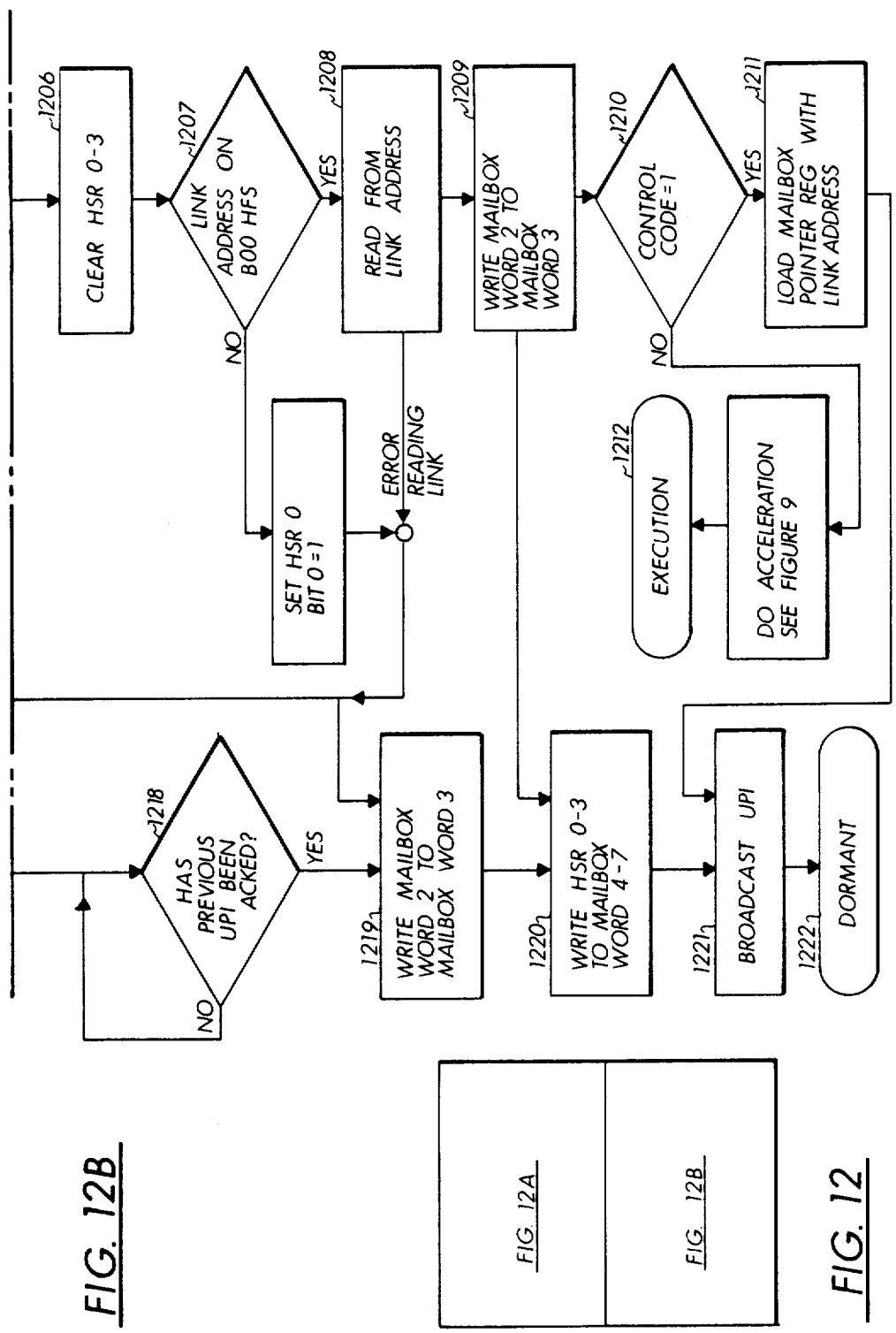

The algorithm illustrated in FIG. 12 defines the operations that occur in the switching state. The switching state is entered at step 1201 whenever a UPI interrupt is received in the dormant state. It is entered at step 1213 when an external interrupt occurs in the executing state. The algorithm proceeds through sequential steps until it exits either to the executing state a step 1212 or to the dormant state at step 1222.

| STEP | DESCRIPTION |
|------|-------------|
| 1201 | If bits 1 and 2 of HSR0 are not zeroes, go to step 17. |
| 1202 | Read mailbox word 2. If an error occurs, record the status in HSR's, and go to step 17. |
| 1203 | Acknowledge the UPI interrupt just received. |
| 1204 | Wait here if a previously sent UPI interrupt has not been acknowledged. Proceed when the acknowledge arrives. |
| 1205 | If the control code is 0 or 2, go to step 19. |
| 1206 | Clear HSR0-3 to all zeroes. |
| 1207 | If the LINK address read from mailbox word 2 is not on a 16-word boundary, set HSR0 bit 0, and go to step 19. |
| 1208 | Read from storage using the LINK address to ensure it is a valid address. If any error is encountered, record the status (in HSR's) and go to step 19. |
| 1209 | Write mailbox word 3. The CURRENT FUNCTION value will be either 1 or 3 as read from word 2 in step 2, and the CURRENT ADDRESS will be the LINK address just validated. If an error occurs, record the status (in HSR's) and go to step 20. |
| 1210 | If the control code is 1, then establish the LINK value as the new mailbox address in the SP hardware, and to to step 21. |
| 1211 | Accelerate the SPCB and the activity. This is shown in detail in FIG. 9. |
| A. 912 | In order to accelerate the SPCB, the mail- |

-continued

| STEP | DESCRIPTION |
|---|---|
| | box pointer register is used for the HPSU address to locate the SPCB. |
| B. 914 | SPCB words 0-15 are read to the SVP local store. |
| C. 916 | AST data is read to local store. |
| D. 918 | SPCB word 6 contains the Register Save Area address, which is the next data loaded to Local Store. |
| E. 920 | LOAD RSA data to the SVP Local Store. At this point the SVP Local Store contains: SPCB (0-15) AST G-REGS (0-15) VL & EL (0-7) S-REG (0-15) JUMP HISTORY FILE (0-31) |
| E. 936 | A parallel operation is done to transfer the data in local store to the SVP registers, while loading the vector files from the HPSU. |
| F. 932 | When the register data has been transferred and the Vector Files are loaded, the Local Store is loaded from the HPSU. The address and length of Local Store are gotten from the first AST entry. |
| 1212 | Go to the executing state. |
| | Begin here for an external interrupt occurring while executing: |
| 1213 | If the interrupt is an SVP hardware check or Power Loss, set bit 34 of SPCB word 13 and go to step 15. |
| 1214 | Decelerate activity state except SPCB. This is shown in detail in FIG. 10. A. Deceleration will be the reverse of acceleration, except some data need not be decelerated, that has not changed during the execution of the activity (AST DATA). |
| 1014 | B. The SVP local store (LS) is the first block of data to be transferred back to the HPSU. The address and length of LS is from the first AST entry. C. A parallel operation occurs where the vector files 1016 are stored to the HPSU while the RSA data is loaded to LS. Data 1018 loaded to LS includes: G-Registers (0-15) VL & EL (0-7) State Registers (0-15) Jump History file (0-31) |
| | D. 1020 When the vector file stores are done, the RSA data is transferred to the HPSU. The address for the HPSU is from SPCB 5. |
| 1215 | Decelerate SPCB words 8-15. If an error occurs, abandon this attempt, record the status, and continue with the next step. |
| 1216 | Change the internal copy of the CURRENT FUNCTION value from 3 to 2. |
| 1217 | Acknowledge any UPI interrupt received. |
| 1218 | Wait here if a previously sent UPI interrupt has not been acknowledged. Proceed when the acknowledge arrives. |
| 1219 | Write mailbox word 3. The CURRENT FUNCTION value will be the same as the CONTROL CODE last read from mailbox word 2 unless altered by step 16. The CURRENT ADDRESS value will be the same as the LINK value last read from mailbox word 2. (When decelerating an activity, this is the SPCB address used.) |
| 1220 | Write HSR0-3 to mailbox words 4-7. This is the most crucial step of the process, so system design attention was given to ensuring the reliability of this step. Ultimately, failure of this step should result in the SP being functionally removed from the system. |
| 1221 | Send a UPI interrupt to the host. |
| 1222 | Go to the dormant state. |

A UPI interrupt received while in the switching state is not considered an error. The HSR0 bit is set immediately, but the flow through the algorithm is generally not altered, except as specifically called out. Power-loss interrupts are treated the same way during switching. There is assumed to be time to complete the algorithm before dealing with the power loss.

In view of the foregoing description, it can be seen that the various stated objectives and purposes of the invention have been achieved. It is, of course, understood that various changes in logical circuit arrangement, circuit selection, and functionality will become apparent to those skilled in the art after having considered the teaching of applicant without departing from the spirit and scope of the invention. Accordingly, what is intended to be protected by Letters Patent is set forth in the Claims.

We claim:

1. In a scientific data processor requiring an external executive control program, said scientific data processor having an activity switch which includes an instruction cache buffer to receive the temporarily store data from a main storage, an instruction address selection logic means connected to said instruction cache buffer and an instruction decode and sequencing control means coupled to said instruction cache buffer, apparatus for controlling said activity switch of said scientific processor at the macro instruction level comprising:

(a) macro code storage means to store a plurality of macro coded instructions and to provide a source thereof;

(b) macro code control means responsive to a plurality of interrupt signals from various sources and to provide a plurality of control signals;

(c) a source of data from a main storage means; and (d) an instruction buffer writer data selector means commonly connected to (a), (b) and (c) to selectively receive information from either said (a) or (c) under the control of (b) such that in response to any one of a plurality of interrupt signals to said macro code control means, said macro code control means causes said instruction buffer write data selector means to selectively shift from the receipt of data from said main storage to the receipt of data from said macro code store means thereby providing macro level control of the activity switch in the scientific processor.

2. The invention as set forth in claim 1 wherein the plurality of control signal means provided by said macro code control means includes at least one control signal means to said instruction address selection logic means and at least one control signal means to said instruction decode and sequencing control means to thereby provide logical selection, instruction decode and sequencing of the macro coded instructions emanating from said macro code storage means.

3. The invention as set forth in claim 2 wherein said activity switch includes a processor state storage means connected to said source of data from main storage to simultaneously receive said data as it is received by said instruction buffer write data selector means.

4. The invention as set forth in claim 3 wherein said processor state storage means is connected to provide a first signal path to return data to said main storage means and a second signal path to send data to said instruction address logic selection means.

5. The invention as set forth in claim 4 wherein said instruction decode and sequencing control means includes a further signal path means connected to said instruction address selection logic means to provide decoding and sequencing information for the desired selection of an instruction address.

6. In a scientific data processor requiring an external executive central program, said scientific data processor having an activity switch which controls its activation and deactivation, a macro level control apparatus for the controlling of such activity switch comprising:

a macro code storage means capable of storing a plurality of macro coded instructions;

a source of instruction data from a main storage means;

a selection means connected to said macro code storage means and to said source of data from the main storage means to selectively determine and provide as a selected output of either the macro code instructions or the instruction data from the main storage means;

a plurality of sources of interrupt signals collected from various sources, internal to and external of, said scientific data processor; and a macro code control means connected to the plurality of sources of interrupt signals and to said selection means to cause said selection means to switchably connect to either said source of instruction data or said macro code storage means under the control of said interrupt signals.

7. A macro level control apparatus for the control of an activity switch in a scientific processor which scientific processor requires an executive control program comprising:

(a) a plurality of interrupt signal sources;

(b) a macro code control means connected thereto for activation thereby;

(c) a macro code storage means having stored therein a plurality of macro code instructions;

(d) a main storage of the scientific processor to provide a source of instruction data;

(e) a data selector means commonly coupled to both said source of instruction data from the main storage of the scientific processor and to the macro code storage means;

(f) said macro code control means also connected to said data selector means for selective control thereof upon activation by certain ones of said plurality of interrupt signal sources; and (g) an instruction cache buffer means connected to the data selector means for receiving instructions from either said source of instruction data or said macro code storage means.

* * * * *